US012524845B2

(12) United States Patent
Kreis et al.

(10) Patent No.: US 12,524,845 B2
(45) Date of Patent: Jan. 13, 2026

(54) SYNTHESIZING CONTENT USING DIFFUSION MODELS IN CONTENT GENERATION SYSTEMS AND APPLICATIONS

(71) Applicant: Nvidia Corporation, Santa Clara, CA (US)

(72) Inventors: Karsten Julian Kreis, Vancouver (CA); Tim Dockhorn, Vancouver (CA); Arash Vahdat, San Mateo, CA (US)

(73) Assignee: Nvidia Corporation, Santa Clara, CA (US)

( * ) Notice: Subject to any disclaimer, the term of this patent is extended or adjusted under 35 U.S.C. 154(b) by 281 days.

(21) Appl. No.: 18/319,986

(22) Filed: May 18, 2023

(65) Prior Publication Data

US 2023/0377099 A1 Nov. 23, 2023

Related U.S. Application Data

(60) Provisional application No. 63/344,001, filed on May 19, 2022.

(51) Int. Cl.
*G06T 5/70* (2024.01)
*G06N 3/045* (2023.01)
(Continued)

(52) U.S. Cl.
CPC ............. *G06T 5/70* (2024.01); *G06N 3/045* (2023.01); *G06N 3/08* (2013.01); *G06T 7/64* (2017.01);
(Continued)

(58) Field of Classification Search
CPC ........ G06N 3/0475; G06N 3/042; G06N 3/08; G06N 3/096; G06N 3/045; G06N 3/09; G06N 3/084; G06N 3/047; G06N 3/0455; G06N 3/0464; G06T 5/70; G06T 7/64; G06T 11/00; G06T 5/60; G06T 2207/20081; G06T 2200/28; G06T 2207/20084; G06T 2207/30241; G06T 5/50; G06T 2207/20182; G06T 2207/20221; G06V 10/764; G06V 10/82
See application file for complete search history.

(56) References Cited

U.S. PATENT DOCUMENTS 11,257,189 B2 * 2/2022 Park ...................... G06T 7/194
2006/0153435 A1 * 7/2006 Wallmark ................ G06T 7/64
382/129

(Continued)

*Primary Examiner* — Xilin Guo
(74) *Attorney, Agent, or Firm* — Hogan Lovells US LLP

(57) ABSTRACT

Approaches presented herein provide for the generation of synthesized data from input noise using a denoising diffusion network. A higher order differential equation solver can be used for the denoising process, with one or more higher-order terms being distilled into one or more separate efficient neural networks. A separate, efficient neural network can be called together with a primary denoising model at inference time without significant loss in sampling efficiency. The separate neural network can provide information about the curvature (or other higher-order term) of the differential equation, representing a denoising trajectory, that can be used by the primary diffusion network to denoise the image using fewer denoising iterations.

20 Claims, 17 Drawing Sheets

(51) Int. Cl.
*G06N 3/08* (2023.01)
*G06T 7/64* (2017.01)
*G06T 11/00* (2006.01)

(52) U.S. Cl.
CPC .......... *G06T 11/00* (2013.01); *G06T 2200/28* (2013.01); *G06T 2207/20081* (2013.01); *G06T 2207/20084* (2013.01); *G06T 2207/30241* (2013.01)

(56) References Cited

U.S. PATENT DOCUMENTS

| | | | | |
|---|---|---|---|---|
| 2022/0107378 A1* | 4/2022 | Dey | ........................ | G01R 33/56 |
| 2022/0215510 A1* | 7/2022 | Weinmann | ................ | G06T 5/70 |
| 2023/0067841 A1* | 3/2023 | Saharia | .................. | G06N 3/047 |
| 2023/0080693 A1* | 3/2023 | Hu | ........................... | G06T 5/70 |
| | | | | 382/275 |

* cited by examiner

First truncated Taylor method
Second truncated Taylor method

SYNTHESIZING CONTENT USING DIFFUSION MODELS IN CONTENT GENERATION SYSTEMS AND APPLICATIONS

CROSS-REFERENCE TO RELATED APPLICATION

This application claims priority to, and the benefit, of U.S. Provisional Patent Application No. 63/344,001, filed May 19, 2022, titled "DIFFUSION MODELS WITH HIGHER ORDER SCORE FLOWS," the full disclosure of which is hereby incorporated in its entirety for all purposes.

BACKGROUND

In various applications—such as for animation or video game creation, for example—there can be a need to generate images of a variety of different types of objects, where individual objects have unique appearances with respect to object in other generated images. In at least one embodiment, a denoising diffusion generative model can be used to generate such image content. Denoising diffusion generative models, such as score-based generative models (SGMs), typically generate data through iterative step-wise denoising from random noise. To synthesize novel data, however, SGMs require many iterative denoising steps, each of which corresponds to a call to a deep neural network. Synthesizing a single batch of novel data can require many such deep neural network calls, which can result in slow sampling and generation process. Furthermore, sampling from SGMs can be described as solving an ordinary differential equation (ODE) and the stepwise synthesis process of SGMs corresponds to iteratively solving this generative ODE. This ODE is primarily described by a score function, which can take the form of the gradient of the logarithm of the probability distribution of the diffused data, as may be based on a fixed forward diffusion process. It is this score function that is learned and approximated with a neural network in SGMs. However, the sampling speed limitation of SGMs can result in a lengthy synthesis process, which can come with unnecessary resource usage and cost.

BRIEF DESCRIPTION OF THE DRAWINGS

Various embodiments in accordance with the present disclosure will be described with reference to the drawings, in which.

DETAILED DESCRIPTION

Figure 1:
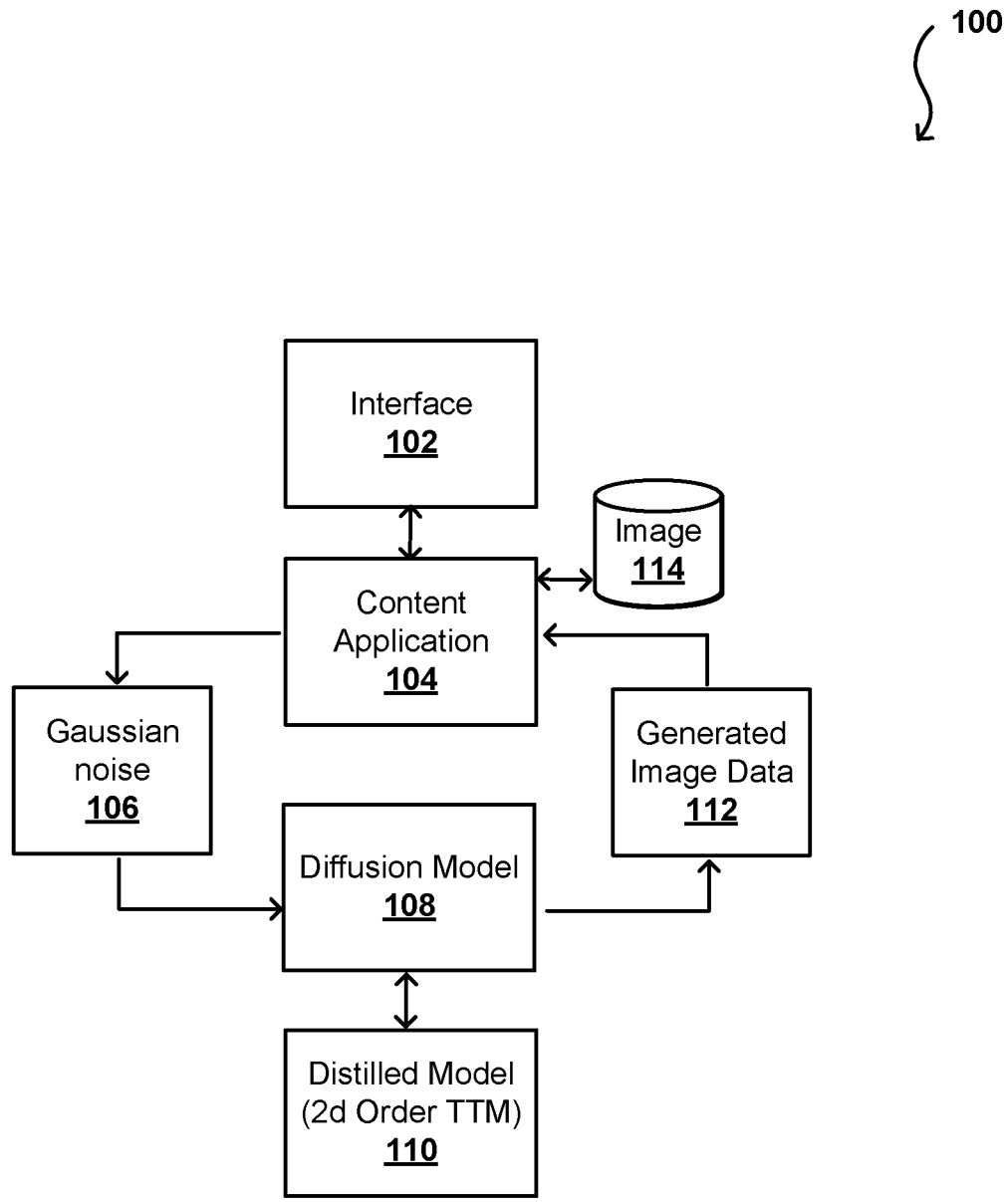
FIG. 1 illustrates an example system for generating synthesized image data, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

The systems and methods described herein may be used by, without limitation, non-autonomous vehicles, semi-autonomous vehicles (for example, in one or more advanced driver assistance systems ("ADAS")), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, generative AI with large language models ("LLMs"), light transport simulation (for example, ray-tracing, path tracing, etc.), collaborative content creation for three-dimensional ("3D") assets, cloud computing and/or any other suitable applications.

Disclosed embodiments may be comprised in a variety of different systems such as automotive systems (for example, a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more Virtual Machines ("VMs"), systems for performing synthetic data generation operations, systems implemented at least partially in a data center, systems for performing conversational AI operations, systems for performing generative AI operations using LLMs, systems for performing light transport simulation, systems for performing collaborative content creation for 3D assets, systems implemented at least partially using cloud computing resources, and/or other types of systems.

In at least one embodiment, a process for generating or synthesizing novel image (or other) content using a deep neural network-based generative model, such as a denoising diffusion generative model or score-based generative model, can be performed that is faster, or requires fewer processing steps, than at least some prior generative processes. In at least one embodiment, an increase in speed of synthesis can be obtained by learning and using one or more higher order ordinary differential equation (ODE) solvers. In at least one embodiment, these solvers may use a second truncated Taylor method (TTM) that can capture local curvature of an ODE gradient field. Being able to determine the curvature of the ODE allows for more accurate extrapolation and, therefore, allows larger steps to be taken than would be used in first TTM approaches where many small linear steps are required to approximate the curvature. These larger step sizes enable fewer steps and calls to the neural network to be required, which improves the speed of the overall sampling and synthesis process. In order to obtain the curvature information in an efficient manner, a separate light-weight neural network can be used that can be called together with the regular denoising model at inference time without significant loss in sampling efficiency.

Leveraging higher order truncated Taylor methods allows for the use of such a second (or higher) order ODE solver to more efficiently solve the ODE for generation in score-based generative models (SGMs) using neural network calls. In contrast to standard SGMs, a second-order ODE solver according to at least one embodiment uses a second-order score function, such as the Jacobian of the first-order score function (which itself models the spatial gradient of the logarithm of the probability distribution of the diffused data). This represents a very high-dimensional object, as may correspond to the dimensionality of the data squared, which is intractable to form directly. An ODE solver can directly use the product of this Jacobian with different vector terms that have lower dimensionality, such as on the order of the dimensionality of the data itself. In the case of images, for instance, the data dimensionality would be given by three times the resolution squared, where the value of three corresponds to the three RGB channels. These combined Jacobian-vector products themselves have lower dimensionality as well. The Jacobian-vector products can be calculated from the regular first-order score function model, in at least one embodiment, that is learned for regular SGMs. In one example, the calculated Jacobian-vector products can be used directly based on the regular first-order score function to run the ODE solver. As an alternative, the Jacobian-vector products and all other necessary terms for a higher-order ODE solvers can be determined based in part on the regular learned first-order score function, but then distilled into separate neural networks. At inference time, a distilled neural network model can be called that directly predicts all necessary higher-order terms for the ODE sampler. This is computationally more efficient than calculating these higher-order terms (Jacobian-vector products) each time from scratch during generation. In such an approach, the higher-order terms can be distilled into one or more small neural networks that are connected to the last feature layer of the regular score function network, which is learned initially to model the regular first-order score function. The feature representations learned by the first-order score function neural network can be leveraged, with only small prediction heads with little computational overhead being added on top to also predict the necessary higher-order terms. Such distillation of the higher-order ODE terms into separate neural networks can leverage standard deep learning optimizers and techniques. An approach in accordance with at least one embodiment is sufficiently general to be used with any appropriate SGMs. For example, it could be used in models for image, speech, audio, or 3D shape synthesis.

Variations of this and other such functionality can be used as well within the scope of the various embodiments as would be apparent to one of ordinary skill in the art in light of the teachings and suggestions contained herein.

Approaches in accordance with various illustrative embodiments provide for an efficient content generation process. FIG. 1 illustrates an example content generation system 100 that can be used in accordance with at least one embodiment. In this example, an instruction to generate an instance of content can be received to an interface 102, such as a graphical user interface (GUI) of a client device or an application programming interface (API) exposed by a server, among other such options. The instruction can be directed to a content application 104, which can use a generative model to generate image data in response to the instruction. In this example, a generative diffusion model 108 is used to generate the image content. The content application can provide "random" noise, such as Gaussian noise 106, as input to a generative diffusion model 108. The generative diffusion model 108 can take the noise as input and attempt to "denoise" the input—such as a random noise image—over a number of denoising iterations. A result of the denoising process can be generated image data 112 including a representation of one or more objects of a class for which the diffusion model 108 was trained. In at least one embodiment, a different or novel object will be generated by the diffusion model 108 for each different random noise image that is provided as input. The generated image data 112 can be provided to the content application 104, which can perform an operation with the content corresponding to the received instruction or request, such as to provide the content for presentation, include the generated content in an image or video to be rendered, or store the content to an image repository 114 for subsequent usage, among other such options.

In at least one embodiment, a denoising diffusion model (DDM) 108 can slowly perturb data during a forward diffusion process used to gradually denoise. Synthesis can amount to solving a differential equation (DE) defined by the learned model. Solving the DE can take advantage of iterative solvers for high-quality generation. In at least one embodiment, a distilled model 110 can be used to help reduce the number of steps needed for the diffusion model 108 to denoise an input image. This can involve the use of a higher-order denoising diffusion solver, as may be based on a higher order—that is, at least a second order—truncated Taylor method (TTM). A higher-order solver can help to significantly accelerate the synthesis process. One such solver can use higher-order gradients of a perturbed data distribution, or higher-order score functions. In at least one embodiment, only Jacobian-vector products (JVPs) are used, and these JVPs can be extracted from the first-order score network via, for example, automatic differentiation. The JVPs can be distilled into a separate neural network 110 that allows for efficient computation of the necessary higher-order terms for a sampler during synthesis. In at least one embodiment, a small additional network head can be used on top of the first-order score network or diffusion model 108. Such an approach can solve a true generative DE and still enable applications such as encoding and guided sampling. In at least one embodiment, the architecture of a prediction head can be based on a convolutional network with one or more residual blocks, as may include (modified) BigGAN residual blocks. To minimize computational overhead, only a single residual block is used in at least one embodiment. This small network can be trained using the same training data as is used for the large diffusion network, but training will not occur with respect to a denoised image but instead with respect to an inferred curvature of a denoising trajectory according to a derivative term of a higher order differential equation. Once trained, the small network (or distilled model 110) can infer the curvature of the denoising trajectory without having to perform expensive backpropagation.

Denoising diffusion models (DDMs) provide benefit in such operations at least because they can offer high synthesis quality and sample diversity in combination with a robust and scalable learning objective. DDMs can be used for operations including, but not limited to, image and video synthesis, super-resolution, deblurring, image editing and inpainting, text-to-image synthesis, conditional and semantic image generation, and image-to-image translation, as well as for inverse problems in medical imaging. DDMs can also enable high-quality speech synthesis, 3D shape generation, molecular modeling, maximum likelihood training, and more. In DDMs, a diffusion process gradually perturbs the data towards random noise, while a deep neural network learns to denoise. Formally, the problem reduces to learning the score function, or the gradient of the log-density of the perturbed data. The (approximate) inverse of the forward diffusion can be described by an ordinary differential equation (ODE) or a stochastic differential equation (SDE), defined by the learned score function, and can therefore be used for generation when starting from random noise.

A significant drawback of DDMs for at least some operations relates to the fact that a generative ODE or SDE is typically difficult to solve, due to the complex score function. Therefore, efficient and tailored samplers are typically required for fast synthesis. Approaches in accordance with at least one embodiment can instead use a higher order solver, such as a second-order ODE solver, using a truncated Taylor method (TTM). Such higher-order methods can use higher-order gradients of the ODE, which can include higher-order gradients of the log-density of the perturbed data, or higher-order score functions. Because such higher-order scores are usually not available, existing approaches typically use simple first-order solvers or samplers with low accuracy, or higher-order methods that rely on suboptimal finite difference or other approximations.

Figure 2A:
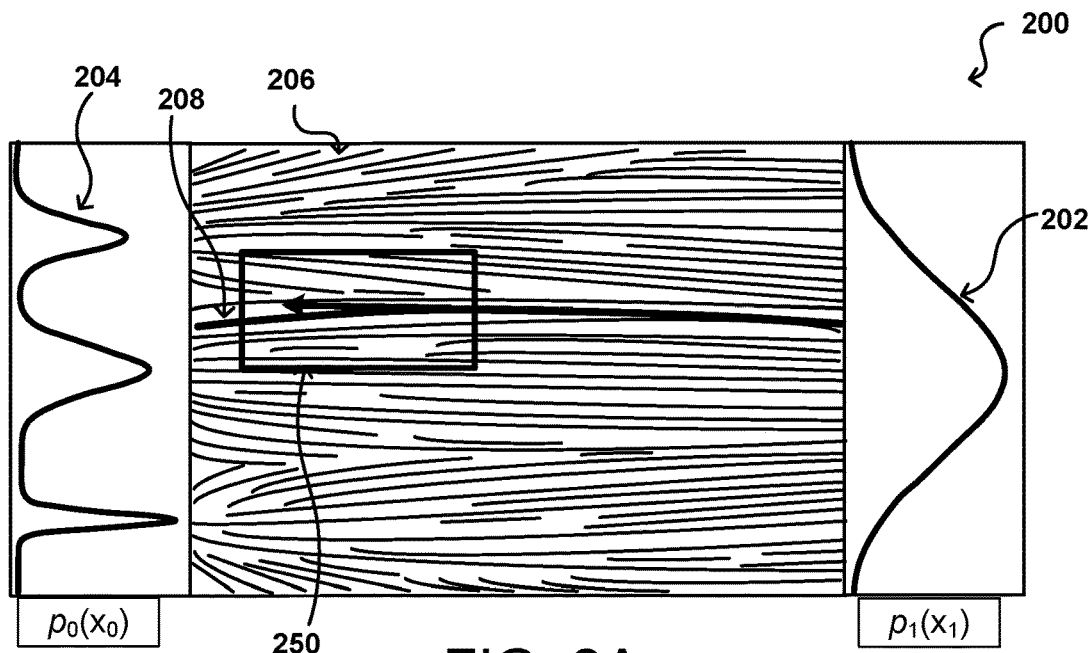
FIGS. 2A, 2B, and 2C illustrate denoising trajectories and step paths that can be taken over one or more iterations of a denoiser, according to at least one embodiment.

Approaches in accordance with at least one embodiment can, instead of relying on such approximations, directly model the higher-order gradient terms. When training a diffusion model, noise is added to a training image and that noisy training image is provided as input to the diffusion model, which then iteratively tries to remove noise over a number of steps or iterations in order to arrive back at the original training image, or where the "denoised" image produced by the diffusion model is the same as the original training image, at least within a level of tolerance or similarity, among other such comparative metrics. Once the network is trained, the network can generate samples—such as unique objects from within object classes for which the network was trained—by taking as input a very noisy image, such as an image that contains only pixel values corresponding to random or Gaussian noise, and providing a prediction or inference as to the color values (or pixel values) of a corresponding clean (or denoised) image. As discussed in more detail elsewhere herein, the iterative process can be described using a differential equation, where a "denoising" path learned or followed by a trained model or network corresponds to a trajectory 208 through space, such as is illustrated in FIG. 2A. A given trajectory 208 can describe a path from random or Gaussian noise 202 to a curve 204 associated with an object in the corresponding denoised image. Once such a differential equation formalism is defined for generating samples, one or more differential equation solvers can be used to solve that equation. A first order solver—such as may be based on Euler's method—may take a large number of steps or iterations to solve the equation since the corresponding segment or vector for each step or iteration is linear, and thus cannot be too long otherwise the deviation from the appropriate trajectory can become too large. It can be desirable to use a solver that requires fewer steps or iterations, and thus can come to a solution much more quickly and with a reduced processing requirement or usage.

FIG. 2A illustrates an example set of probability flow ODE trajectories 206 between an input Gaussian curve 202 and an output curve 204 representative of a synthesized object. As illustrated, the trajectories can be quite curved in nature. A first order solver of prior approaches can use linear trajectories over a number of steps to approximate the curvature of an appropriate trajectory. At each sample point along the trajectory, the first order solver would use a linear segment or vector which would essentially be in a direction along a tangent of the trajectory at that sample point (from the last step or iteration). In order to provide for a relatively accurate approximation of the curvature using straight segments for each step, a large number of relatively small step sizes is needed, as the linear nature of a first order vector with respect to a linear trajectory means that larger step sizes will result in a higher divergence between the vectors and the trajectory, which can result in a lower accuracy approximation. Taking smaller steps can improve the accuracy, but the need for a larger number of smaller steps can dramatically increase the length of time needed to perform sampling and generation.

Figure 2B:
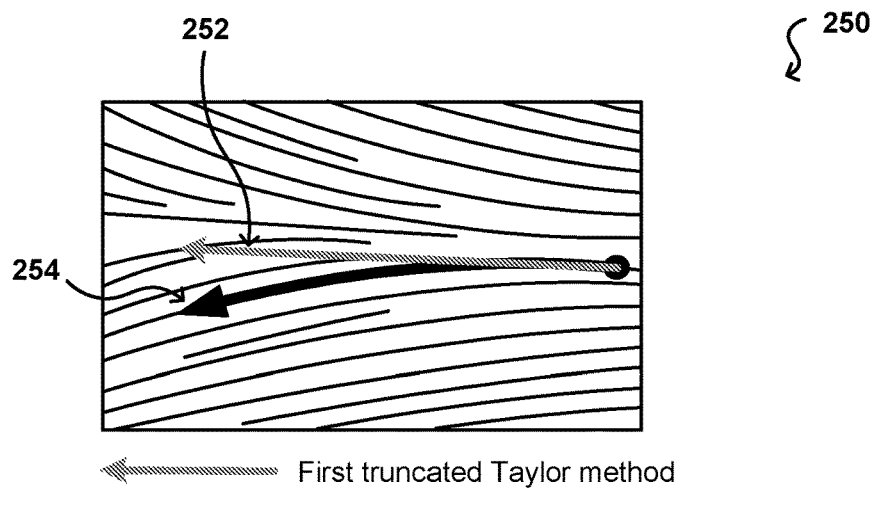
Figure 2C:
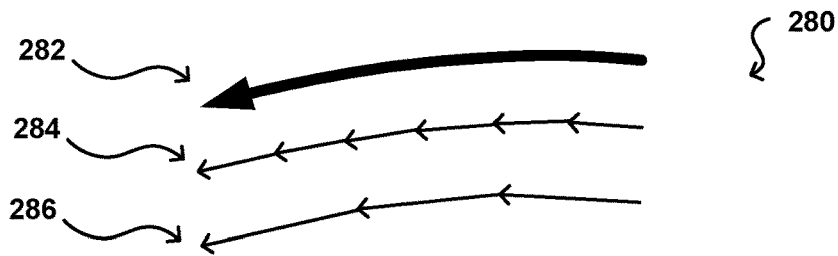

As illustrated in the region 250 illustrated in FIG. 2B, an approximation approach according to at least one embodiment can instead use curved segments for each iterative step. As illustrated, a properly-determined curved segment 254 (or vector) can track a portion of a given non-linear trajectory more accurately than a straight segment 252 (or vector). This allows larger step sizes to be used, as the deviation of a linear vector from the trajectory can increase rapidly with larger step sizes, while an appropriately curved segment 254 may track the trajectory relatively well over larger step sizes. As illustrated in FIG. 2C, three different step sizes and number of steps can be used in different examples, where a single step size can be used for a first curved segment 282 that is able to follow a trajectory within an allowable amount of error or deviation. A set of segments 284 with six steps or a set of segments 286 with three steps might be used for straight segments or vectors, depending in part on the amount of allowable error or deviation. These additional steps require additional processing time and resources, which can reduce the efficiency of the process and decrease the performance of the computer system performing the operations. Being able to use a curved segment that more closely follows the trajectory allows larger step sizes to be taken, which reduces the number of steps needed to follow the trajectory from input noise to "denoised" output. A higher-order denoising diffusion solver can thus use a higher order TTM, such as the second truncated Taylor method, to simulate a re-parametrized probability flow ODE for sampling denoising diffusion models. The second TTM captures local curvature of the gradient field of the ODE, and enables more accurate extrapolation and larger step sizes than the first TTM (Euler's method) which was used previously.

Using a second TTM is not straightforward in at least some instances, however, as there can be terms in the second TTM equation—discussed in more detail below—for which values are not readily available using existing approaches. Referring back to FIG. 1, a distilled model 110 (or other small model or network) can be used to perform an approximation for these second order terms that can be used with the diffusion model 108 or primary solver. A large diffusion model 108 can provide everything needed for a first order solver, but obtaining the information for a higher order term using such a large network can be very inefficient, particularly for a large diffusion model that requires many denoising iterations involving gradient calculations performed by the large network.

As mentioned previously, an example higher-order denoising diffusion solver (referred to herein as "GENIE") can use Jacobian-vector products (JVPs) involving second-order scores. These JVPs can be calculated through automatic differentiation of the regular learnt first-order scores. For computational efficiency, the entire higher-order gradient of the ODE, including the JVPs, can be distilled into a separate neural network. In practice, only a small head might be added to the first-order score network to predict the components of the higher-order ODE gradient. Directly modeling the JVPs can avoid explicitly forming high-dimensional higher-order scores. Intuitively, the higher-order terms in GENIE capture the local curvature of the ODE and enable larger steps when iteratively solving the generative ODE, as illustrated in FIGS. 2A-2C. Such an approach can achieve high quality performance in solving the generative ODE of DDMs, but with significantly fewer synthesis steps than would be needed in existing approaches, which can save both compute time and cost, and can improve the efficiency of a computing system performing such operations. In contrast to existing methods that fundamentally modify the generation process of DDMs by training conditional GANs or by distilling the full sampling trajectory, a GENIE-based approach can solve the true generative ODE. Such an approach can thus still encode images in the latent space of a DDM, as used for operations such as image interpolation, and can use techniques such as guided sampling.

In at least one embodiment, continuous-time DDMs can be used whose forward process can be described by:

$$p_t(x_t|x_0) = \mathcal{N}(x_t; \alpha_t x_0, \sigma_t^2 I), \quad (1)$$

where $x_0 \sim p_0(x_0)$ is drawn from the empirical data distribution and $x_t$ refers to diffused data samples at time $t \in [0,1]$ along the diffusion process. The functions $\alpha_t$ and $\sigma_t$ can be chosen such that the logarithmic signal-to-noise ratio log $$\frac{\alpha_t^2}{\sigma_t^2}$$

decreases monotonically with t and the data diffuses towards random noise, such as may be given by $p_1(x_1) \approx \mathcal{N}(0, I)$. A variance-preserving diffusion processes can be used for which $\sigma_t^2 = 1 - \alpha_t^2$, although approaches in accordance with various embodiments can be applicable to more general DDMs as well. An example diffusion process can then be expressed by the (variance-preserving) SDE $$dx_t = -\frac{1}{2}\beta_t x_t dt + \sqrt{\beta_t} dw_t, \quad (2)$$

where $$\beta_t = -\frac{d}{dt}\log\alpha_t^2, \quad x_0 \sim p_0(x_0)$$

and $w_t$ is a standard Wiener process. A corresponding reverse diffusion process that effectively inverts the forward diffusion can be given by:

$$dx_t = -\frac{1}{2}\beta_t[x_t + 2\nabla_{x_t}\log p_t(x_t)]dt + \sqrt{\beta_t} dw_t, \quad (3)$$

and this reverse-time generative SDE is marginally equivalent to the generative ODE:

$$dx_t = -\frac{1}{2}\beta_t[x_t + \nabla_{x_t}\log p_t(x_t)]dt, \quad (4)$$

where $\nabla_{x_t} \log p_t(x_t)$ is the score function. Equation (4) is referred to as the Probability Flow ODE, an instance of continuous Normalizing flows. To generate samples from the DDM, an approach in accordance with at least one embodiment can sample $x_1 \sim \mathcal{N}(0, I)$ and numerically simulate either the Probability Flow ODE or the generative SDE, replacing the unknown score function by a learned score model $s_\theta(x_t, t) \approx \nabla_{x_t} \log p_t(x_t)$.

A DDIM solver in accordance with at least one embodiment can be used to simulate DDMs due, at least in part, to its speed and simplicity. Such a solver can effectively implement Euler's method applied to an ODE based on a re-parameterization of the Probability Flow ODE: Defining $$\gamma_t = \sqrt{\frac{1-\alpha_t^2}{\alpha_t^2}} \text{ and } \bar{x}_t = x_t\sqrt{1+\gamma_t^2}$$

leads to:

$$\frac{d\bar{x}_t}{d\gamma_t} = \sqrt{1+\gamma_t^2}\frac{dx_t}{dt}\frac{dt}{d\gamma_t} + x_t\frac{\gamma_t}{\sqrt{1+\gamma_t^2}} = -\frac{\gamma_t}{\sqrt{1+\gamma_t^2}}\nabla_{x_t}\log p_t(x_t), \quad (5)$$

where Equation (4) was inserted for $$\frac{dx_t}{dt} \text{ and } \beta(t)\frac{dt}{d\gamma_t} = \frac{2\gamma_t}{\gamma_t^2+1}$$

used. Letting $$s_\theta(x_t, t) := -\frac{\epsilon_\theta(x_t, t)}{\sigma_t}$$

denote a parameterization of the score model, the approximate generative DDIM ODE can then be given by:

$$dx_t = \epsilon_\theta(x_t, t) d\gamma_t, \quad (6)$$

where $$\sigma_t = \sqrt{1 - \alpha_t^2} = \frac{\gamma_t}{\sqrt{\gamma_t^2 + 1}}.$$

The model $\epsilon_\theta(x_t, t)$ can be learned by minimizing the score matching objective:

$$\min_\theta \mathbb{E}_{t \sim \mathcal{U}[t_{cutoff}, 1], x_0 \sim p(x_0), \epsilon \sim \mathcal{N}(0, I)} \left[ g(t) \| \epsilon - \epsilon_\theta(x_t, t) \|_2^2 \right], \quad (7)$$

$$x_t = \alpha_t x_0 + \sigma_t \epsilon$$

for small $0 < t_{cutoff} \ll 1$. In at least one embodiment, an approach can be to set $g(t)=1$. Other weighting functions $g(t)$ are possible; for example, setting $$g(t) = \frac{\beta_t}{2\sigma_t^2}$$

recovers maximum likelihood learning.

In at least one embodiment, a higher-order method can be applied to the DDIM ODE, building on the truncated Taylor method (TTM). The $p^{th}$ TTM is illustrated on a general ODE $$\frac{dy}{dt} = f(y, t).$$

The method is, as the name suggests, based on the $p^{th}$ Taylor formula:

$$y_{t_{n+1}} \approx y_{t_n} + h_n \frac{dy}{dt}\bigg|_{(y_{t_n}, t_n)} + \ldots + \frac{1}{p!} h_n^p \frac{d^p y}{dt^p}\bigg|_{(y_{t_n}, t_n)} \quad (8)$$

where $h_n = t_{n+1} - t_n$, and the error is proportional to $h_n^{p+1}$. In at least one embodiment, the first TTM is equivalent to Euler's method. Applying the second TTM to the DDIM ODE results in the following scheme:

$$\bar{x}_{t_{n+1}} = \bar{x}_{t_n} + h_n \epsilon_\theta(x_{t_n}, t_n) + \frac{1}{2} h_n^2 \frac{d\epsilon_\theta}{d\gamma_t}\bigg|_{(x_{t_n}, t_n)} \quad (9)$$

where $h_n = \gamma_{t_{n+1}} - \gamma_{t_n}$. In at least one embodiment, $$\gamma_t = \sqrt{\frac{1 - \alpha_t^2}{\alpha_t^2}},$$

where the function $\alpha_t$ is a time-dependent hyperparameter of the DDM. The total derivative $$d_{\gamma_t} \epsilon_\theta := \frac{d\epsilon_\theta}{d\gamma_t}$$

can then be decomposed as follows:

$$d_{\gamma_t} \epsilon_\theta(x_t, t) = \frac{\partial \epsilon_\theta(x_t, t)}{\partial x_t} \frac{dx_t}{d\gamma_t} + \frac{\partial \epsilon_\theta(x_t, t)}{\partial t} \frac{dt}{d\gamma_t}, \quad (10)$$

where $$\frac{dx_t}{d\gamma_t} = \frac{\partial x_t}{\partial \bar{x}_t} \frac{d\bar{x}_t}{d\gamma_t} + \frac{\partial x_t}{\partial \gamma_t} = \frac{1}{\sqrt{\gamma_t^2 + 1}} \epsilon_\theta(x_t, t) - \frac{\gamma_t}{1 + \gamma_t^2} x_t, \quad (11)$$

If not explicitly stated otherwise, the second TTM applied to the DDIM ODE, as given by the scheme in Equation (9), is referred to as a higher-order denoising diffusion solver ("GENIE"). Intuitively, the higher-order gradient terms used in the second TMM model the local curvature of the ODE. This translates into a Taylor formula-based extrapolation that is quadratic in time (see for example Equations (8) and (9)) and more accurate than linear extrapolation, as in Euler's method, thereby enabling larger time steps as discussed with respect to FIGS. 2A, 2B, and 2C. In at least one embodiment, a third (or higher order) TTM to can be applied to a DDIM ODE as well. In at least one embodiment, TTMs are not restricted to the DDIM ODE and could just as well be applied to, for example, the probability flow ODE or neural ODEs more generally.

Figure 3:
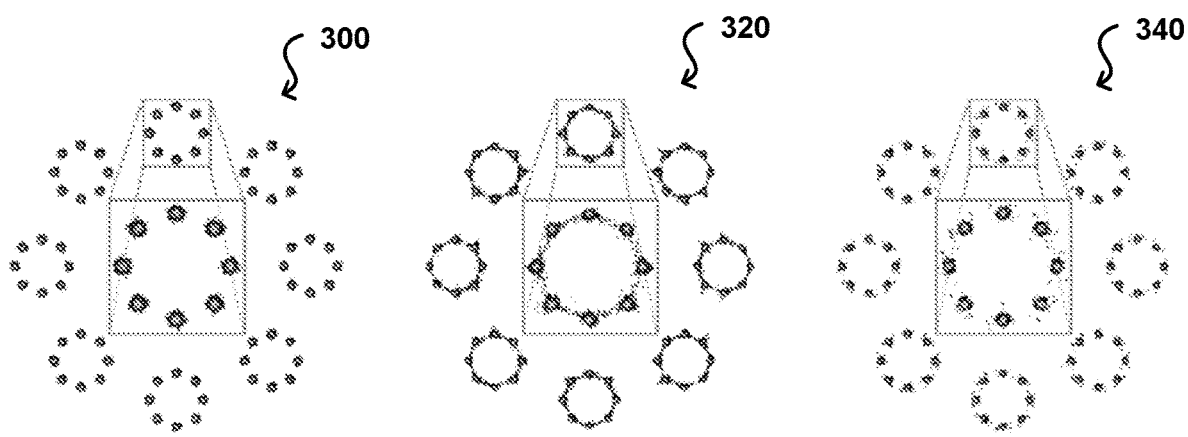
FIG. 3 illustrates input data and example reconstructions, according to at least one embodiment.

In at least one embodiment, a benefit of higher-order methods can be demonstrated on a 2D object distribution 300 illustrated in FIG. 3 for which the score function, as well as all higher-order derivatives useful for GENIE, are known or determinable analytically. In modeling such a complex 2D object distribution, in this example for a "toy" object classification, a first set of samples 320 was generated using a general denoising diffusion implicit model and a second set of samples 340 was generated using GENIE, with 25 solver steps using the analytical score function of the ground truth distribution. Around 1,000 different accurate "ground truth" trajectories $x_t$ were generated using DDIM with 10 k steps. These "ground truth" trajectories can be compared to single steps of DDIM and GENIE for varying step sizes $\Delta t$. The mean $L_2$-distance of the single steps $\hat{x}_t(\Delta t)$ to the "ground truth" trajectories $X_t$ can be measured, and this experiment can be repeated for three starting points $t \in \{0.1, \bullet 0.2, \bullet 0.5\}$. It was observed that GENIE can use larger step sizes to stay within a certain error tolerance for all starting points t. The DDIM approach exhibited a potentially undesired behavior of sampling low-density regions between modes, whereas GENIE appears as a version of the ground truth distribution 300, with the potential for some slight noise introduction in certain examples.

In at least one embodiment, linear multistep methods can be used as an alternative higher-order method to solve ODEs. For example, the Adams-Bashforth (AB) method has been applied to a DDIM ODE. Such methods can be derived from TTMs by approximating higher-order derivatives $$\frac{d^p y}{dt^p}$$

using the finite difference method. For example, the second AB method can be obtained from the second TTM by replacing $$\frac{d^2y}{dt^2}$$

with the first-order forward difference approximation $(f(y_{t_n}, t_n) - f(y_{t_{n-1}}, t_{n-1}))/h_{n-1}$. It has been observed that the mean $L_2$-norm of the difference $\xi_t(\Delta t)$ between the analytical derivative $d_{\gamma_t}\epsilon_\theta$ and its first-order forward difference approximation, for varying step sizes $\Delta t$ for the 2D object distribution, is especially poor at small t for which the score function becomes complex.

For at least some of these reasons, it may be beneficial for at least some operations or examples to apply a GENIE to DDMs of relatively complex and high-dimensional data, such as images. Regular DDMs learn a model E9 for the first-order score; however, the higher-order gradient terms used for GENIE (see for example Equation (10)) are not immediately available, unlike in the object example above. Inserting Equation (11) into Equation (10) and analyzing the terms more closely leads to:

$$d_{\gamma_t}\epsilon_\theta = \frac{1}{\sqrt{\gamma_t^2+1}} \underbrace{\frac{\partial \epsilon_\theta(x_t, t)}{\partial x_t} \epsilon_\theta(x_t, t)}_{JVP_1} - \frac{\gamma_t}{1+\gamma_t^2} \underbrace{\frac{\partial \epsilon_\theta(x_t, t)}{\partial x_t} x_t}_{JVP_2} + \frac{\partial \epsilon_\theta(x_t, t)}{\partial t} \frac{dt}{d\gamma_t}, \quad (12)$$

It can be observed that the full derivative decomposes into two JVP terms and one simpler time derivative term. The term $$\frac{\partial \epsilon_\theta(x_t, t)}{\partial x_t}$$

plays a crucial role in Eq. (12). It can be expressed as:

$$\frac{\partial \epsilon_\theta(x_t, t)}{\partial x_t} = -\sigma_t \frac{\partial s_\theta(x_t, t)}{\partial x_t} \approx -\sigma_t \nabla_{x_t}^T \nabla_{x_t} \log p_t(x_t) \quad (13)$$

which means that GENIE can rely on second-order score functions $\nabla_{x_t}^T \nabla_{x_t} \log p_t(x_t)$.

Given a DDM, or $\epsilon_\theta$, the derivative $d_{\gamma_t}\epsilon_\theta$ for the GENIE scheme in Equation (9) can be computed using automatic differentiation (AD). This would, however, make a single step of GENIE at least twice as costly as DDIM, because such an approach may require a forward pass through the $\epsilon_\theta$ network to compute $\epsilon_\theta(x_t, t)$ itself, and another pass to compute the JVPs in Equation (12). These forward passes are not parallelized, since the vector-part of $JVP_1$ in Equation (12) involves $\epsilon_\theta$ itself, and needs to be known before computing the JVP. To accelerate sampling from DDMs, this overhead will likely be too expensive for at least some operations.

Figure 4:
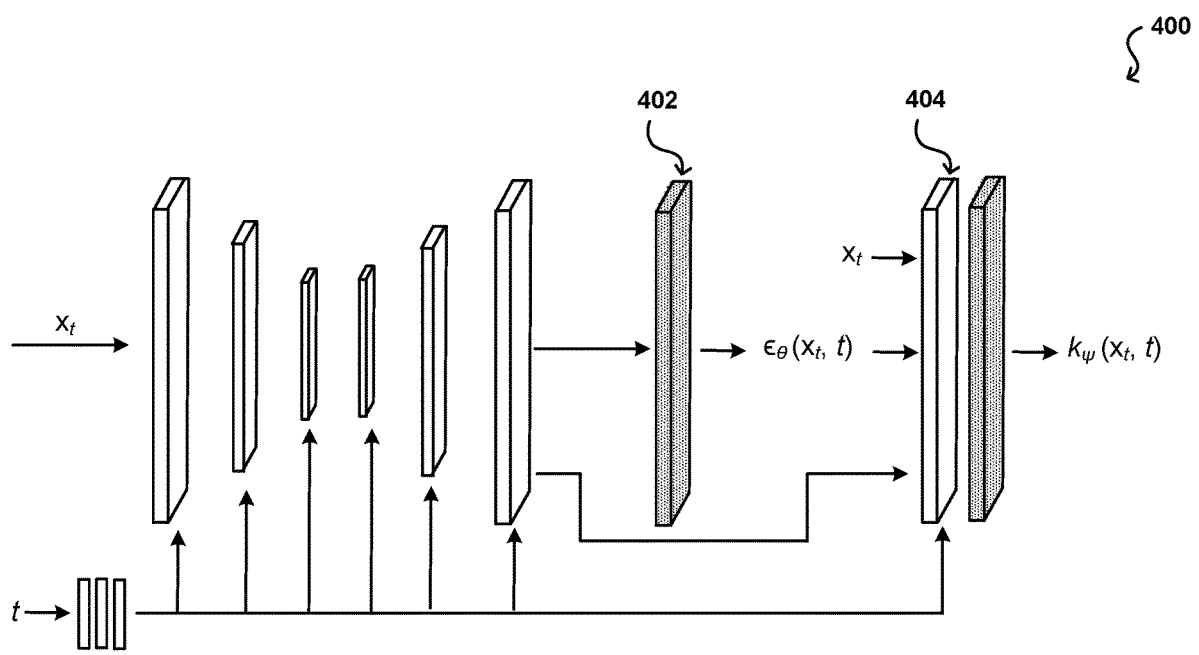
FIG. 4 illustrates an example denoising model with a small, added prediction head, according to at least one embodiment.

To avoid such overhead, $d_{\gamma_t}\epsilon_\theta$ can first be distilled into a separate neural network. During distillation training, the slow AD-based calculation of $d_{\gamma_t}\epsilon_\theta$ can be used, but during synthesis the trained neural network can be called. In at least one embodiment, the internal representations of the neural network modeling $\epsilon_\theta$, such as may use a U-Net architecture, can be used for downstream tasks. A last feature layer 402 (or other appropriate layer) from the $\epsilon_\theta$ network can be provided together with its time embedding, as well as the noisy data point $x_t$, and the output of the diffusion model $\epsilon_\theta(x_t, t)$ in at least one embodiment, to a small prediction head 404 $k_\psi(x_t, t)$ that models the different terms in Equation (12), using a network configuration 400 such as that illustrated in FIG. 4. The distilled model $k_\psi$ can predict the gradient $d_{\gamma_t}\epsilon_\theta$, co and can be implemented as a small additional output head on top of the first-order score model $\epsilon_\theta$. The overhead generated by $k_\psi$ is small, such as less than 2% for a CIFAR-10 model, and such an approach was observed to provide excellent performance. It at least one embodiment, an independent deep neural network could also be trained that does not make use of the internal representations of $\epsilon_\theta$, and could therefore theoretically be run in parallel to the $\epsilon_\theta$ model. Small prediction heads can be used instead of independent neural networks because AD-based distillation training is slow: in each training iteration it may be necessary to call the $\epsilon_\theta$ network, then calculate the JVP terms, and then the distillation model can be called. By modeling $d_{\gamma_t}\epsilon_\theta$, via small prediction heads, while reusing the internal representation of the score model, training can be performed relatively quickly: such an approach may only need to train $k_\psi$ for up to 50 k iterations. In contrast, training score models from scratch can take roughly an order of magnitude more iterations.

The second network (or small prediction head) in at least one embodiment can generate an approximation for the last term in Equation (9) above. In at least one embodiment, this final term can be evaluated using backpropagation through the diffusion model, but as mentioned, backpropagation can be relatively slow, so it can be undesirable to perform backpropagation using the large, main diffusion model. In at least one embodiment, a lengthier training process can be used that can result in significantly faster inferencing. The additional network can attempt to infer the derivative of this last term using a derivative matching process during training, such as may use an L2-type loss with a diffusion model objective. The second model can be a small, expressive, distilled model that provides sufficiently accurate performance. The second model can distill the derivative term using input information—such as the internal representation of the input from the diffusion network at the final feature layer (or another appropriate layer)—from the primary diffusion model itself. The internal representations at various layers can be used to predict the curvature needed for a second truncated Taylor method (or similar such approach). An additional benefit is that these representation are already learned from the primary network and do not need to be learned or determined again. An additional output can instead be added on top of this existing data to obtain not only the denoising direction but also the curvature for the trajectory. In at least one embodiment, each intermediate layer of the diffusion network will have an internal representation of the input data, including versions of features extracted from the input data, as may correspond to a version of the image after a respective number of denoising iterations. While any intermediate layer may be used, it can be desirable in at least one embodiment to use a penultimate layer of the network as discussed with respect to FIG. 4.

It has been observed that learning $d_{\gamma_t}\epsilon_\theta$ directly as single output of a neural network can be challenging. Assuming a single data point distribution $p_0(x_0)=\delta(x_0=0)$, for which the diffused score function and all higher-order derivatives are known or can be determined analytically, the terms in Equation (12) all behave very differently within the $t \in [0, 1]$ interval. As an example, the pre-factor of $JVP_1$ in Equation (12) approaches 1 as $t \to 0$, while the pre-factor for $JVP_2$ vanishes. Such a single data point assumption implies an effective mixed network parameterization. In at least one embodiment, a model can be generated as given by:

$$k_\psi = -\frac{1}{\gamma_t} k_\psi^{(1)} + \frac{\gamma_t}{1+\gamma_t^2} k_\psi^{(2)} + \frac{1}{\gamma_t(1+\gamma_t^2)} k_\psi^{(3)} \approx d_{\gamma_t} \epsilon_\theta, \quad (14)$$

where, $k_\psi^{(i)}(x_t, t)$, $i \in \{1, 2, 3\}$, are different output channels of the neural network—the additional head on top of the $\epsilon_\theta$ network. The three terms in Equation (14) exactly correspond to the three terms of Equation (12), in the same order.

As a learning objective, it can be desirable for the model $k_\psi$ to match $d_{\gamma_t} \epsilon_\theta$ for all $t$ and $x_t$. This suggests a simple (weighted) L2-loss for distillation, similar to regular score matching losses for DDMs, as may be given by:

$$\min_\psi \mathbb{E}_{t \sim u[t_{\min},T], 1 | x_0 \sim p(x_0), \epsilon \sim \mathcal{N}(0,I)} [g_d(t) \| k_\psi(x_t, t) - d_{\gamma_t} \epsilon_\theta(x_t, t) \|_2^2], \quad (15)$$

where $x_t = \alpha_t x_0 + \sigma_t \epsilon$. A weighting function $g_d(t) = \gamma_t^2$ can be selected to counteract the division by $\gamma_t$ (note $\gamma_0 = 0$) in the first and third term of the mixed network parameterization in Equation (14). This was observed to lead to a roughly constant loss over different time values t. During training it may be necessary to compute $d_{\gamma_t} \epsilon_\theta$ via AD; however, at inference time the learned prediction head $k_\psi$ can be used to approximate $d_{\gamma_t} \epsilon_\theta$ when sampling with GENIE.

As shown in Equation (13), an approach in accordance with at least one embodiment can rely on second-order score functions. Such higher-order scores can be learned with higher-order score matching objectives. Directly applying these techniques can have a potential downside in at least some situations, however, as the higher-order score terms $\nabla_{x_t}^T \epsilon_\theta(x_t, t)$ may need to be explicitly formed, and can be very high-dimensional for data such as images. Low-rank approximations are possible, but may be insufficient for high performance. In at least one embodiment, such a complication can be avoided by directly modeling the lower-dimensional JVPs. It was observed that methods can be used to provide higher-order score matching objectives for the JVP terms required for GENIE and similar approaches. However, a distillation approach with AD-based higher-order gradients may perform better in at least certain situations. A GENIE can function as an accurate solver for the generative differential equations of DDMs that directly uses higher-order scores—such as in the form of the distilled JVPs—for generative modeling without finite difference or other approximations.

Other approaches can be used as well in accordance with other embodiments. For example, accelerated sampling from DDMs can be performed by adjusting the timesteps used in time-discretized DDMs, such as through grid search or dynamic programming. Modern ODE and SDE solvers can also be used to provide for fast synthesis from (continuous-time) DDMs. In one example, a DDIM ODE can be simulated using a higher-order linear multistep method. Alternatively, sampling from DDMs can also be accelerated via learning. For example, parameters of a generalized family of DDMs can be learned by optimizing for perceptual output quality, or a DDIM sampler can be distilled into a student model, which enables sampling in as few as a single step. In one example, the Gaussian samplers of a DDM can be replaced with expressive generative adversarial networks, similarly allowing for few-step synthesis. In at least one embodiment, a GENIE-based implementation can be considered a learning-based approach, as a derivative of the generative ODE can be distilled into a separate neural network. However, in contrast to the mentioned methods, GENIE still solves the true underlying generative ODE, which has major advantages: for instance, it can still be used easily for classifier-guided sampling and to efficiently encode data into latent space—a prerequisite for likelihood calculation and editing applications. Other approaches to accelerate DDM sampling may change the diffusion itself or train DDMs in the latent space of a Variational Autoencoder, and a GENIE-based approach can be complementary to these methods.

In at least one embodiment, a DDIM ODE can be simulated from $t=1$ up to $t=10^{-3}$ using evaluation times following a quadratic function—such as for quadratic striding. For variance-preserving DDMs, it can be beneficial to denoise the ODE solver output at the cutoff $t=10^{-3}$, such as may be given by:

$$x_0 = \frac{x_t - \sigma_t \epsilon_\theta(x_t, t)}{\alpha_t}$$

The denoising step can involve a score model evaluation, and therefore "loses" a function evaluation that could otherwise be used as an additional step in the ODE solver. To this end, denoising the output of the ODE solver may be set as a hyperparameter of a synthesis strategy. In at least one embodiment, each additional neural network may become important in a low number of function evaluations (NFEs) regime. The performance of GENIE and other such methods can be improved in at least some instances by replacing the learned score with the (analytical) score of $\mathcal{N}(0, I) \approx p_{t=1}(x_t)$ in the first step of the ODE solver. The "gained" function evaluation can then be used as an additional step in the ODE solver. Similarly to the denoising step mentioned above, AFS can be treated as a hyperparameter of the synthesis strategy. A GENIE-based approach can have a slightly increased computational overhead compared to other solvers due at least in part to the prediction head $k_\psi$. The computational overhead was observed to increase by 1.47%, 2.83%, 14.0%, and 14.4% on CIFAR-10, ImageNet, LSUN Bedrooms, and LSUN Church-Outdoor, respectively. This additional overhead can be accounted for implicitly by dividing the NFEs by the computational overhead and rounding to the nearest integer.

In at least one embodiment, an unconditional model $\epsilon_\theta(x_t, t)$ can be replaced with $\hat{\epsilon}_\theta(x_t, t, c, w) = (1+w) \epsilon_\theta(x_t, t, c) - w \epsilon_\theta(x_t, t)$ in the DDIM ODE (see Equation (6) for example), where $\epsilon_\theta(x_t, t, c)$ is a conditional model and $w > 1.0$ is the "guidance scale". GENIE can then use a derivative given by:

$$d_{\gamma_t} \hat{\epsilon}_\theta(x_t, t, c, w) = (1+w) d_{\gamma_t} \epsilon_\theta(X_t, t, c) - w d_{\gamma_t} \epsilon_\theta(x_t, t) \quad (16)$$

for guidance. Hence, an approach can then distill $d_{\gamma_t} \epsilon_\theta(x_t, t, c)$ and $d_{\gamma_t} \epsilon_\theta(x_t, t)$, for which parameters can also be shared. A GENIE-based approach can also be used to solve the generative ODE in reverse to encode given images. GENIE was observed to reconstruct images much more accurately than DDIM-based approaches for at least certain types of images. In at least one embodiment, even higher-order gradients can be leveraged to accelerate sampling from DDMs even further. Fast synthesis from DDMs can potentially make DDMs an attractive method for promising interactive generative modeling applications, such as digital content creation or real-time audio synthesis, and also reduce the environmental footprint of DDM by decreasing the computational load during inference. GENIE can be used advantageously for tasks other than image synthesis as well.

Figure 5:
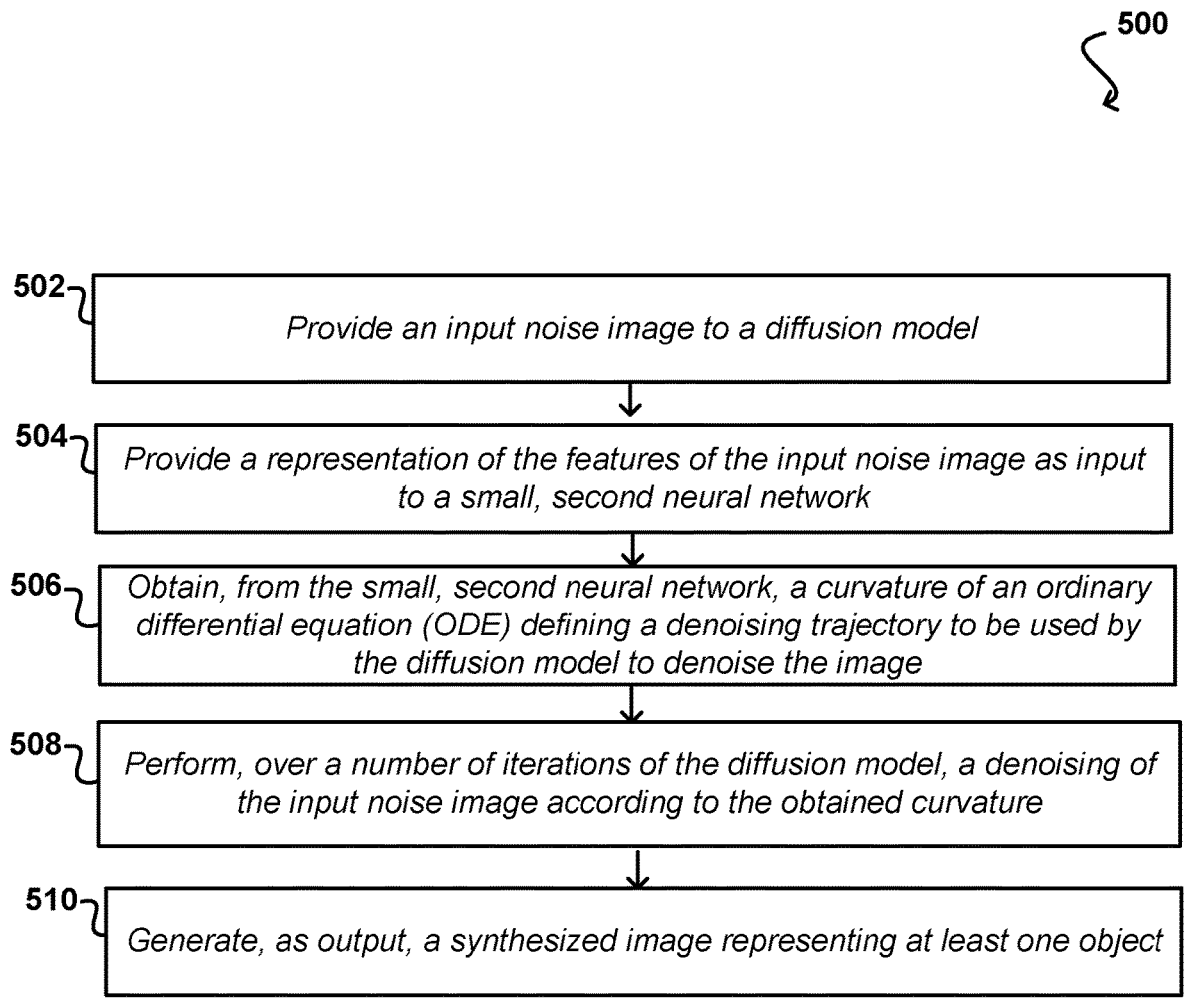
FIG. 5 illustrates an example process for generating synthesized image data using a diffusion model with small, second neural network to determine curvature data, according to at least one embodiment.

FIG. 5 illustrates an example process 500 for generating an image including a "unique" object of at least one object class that can be performed in accordance with at least one embodiment. It should be understood that for this and other processes presented herein that there may be additional, fewer, or alternative steps performed or similar or alternative orders, or at least partially in parallel, within the scope of the various embodiments unless otherwise specifically stated. Further, although this example is described with respect to generating an image, it should be understood that other types of output can be generated as well within the scope of various embodiments. In this example process, an input noise image is provided 502 to a diffusion model. This may be a Gaussian noise image in at least one embodiment, or may correspond to Gaussian noise data independent of an image format, among other such options. A representation of the features of the input noise image can also be provided 504 as input to a small, second neural network. This second network can be substantially smaller than the diffusion model, and can have been trained using intermediate feature data from one or more layers of the diffusion model. A curvature (or other derivative or higher order term value) can be obtained 506 from the second network, where that curvature corresponds to an ordinary differential equation (ODE) defining a denoising trajectory to be used by the diffusion model to denoise the image. A number of iterations of the diffusion model can be used to perform 508 a denoising of the input noise image according to the obtained curvature or higher-order term value. By knowing and being able to use the curvature information, the diffusion model can take fewer, larger steps than would be needed to obtain the same level of accuracy using first order, linear approximations. A synthesized image representing at least one object can then be generated 510 based on the clean image data output from diffusion model during the denoising process. Such a process can be used to generate other types of output as well, such as three-dimensional shape data, audio data, or other such content. The second network can provide a higher-order ODE solver for DDMs as discussed herein. Such an approach can capture the local curvature of the gradient field of an ODE, which allows for larger step sizes when solving the ODE. In at least one embodiment, the higher-order derivatives can be distilled into a small prediction head, which can be efficiently called during inference, on top of the diffusion network, or first-order score network.

Figure 6:
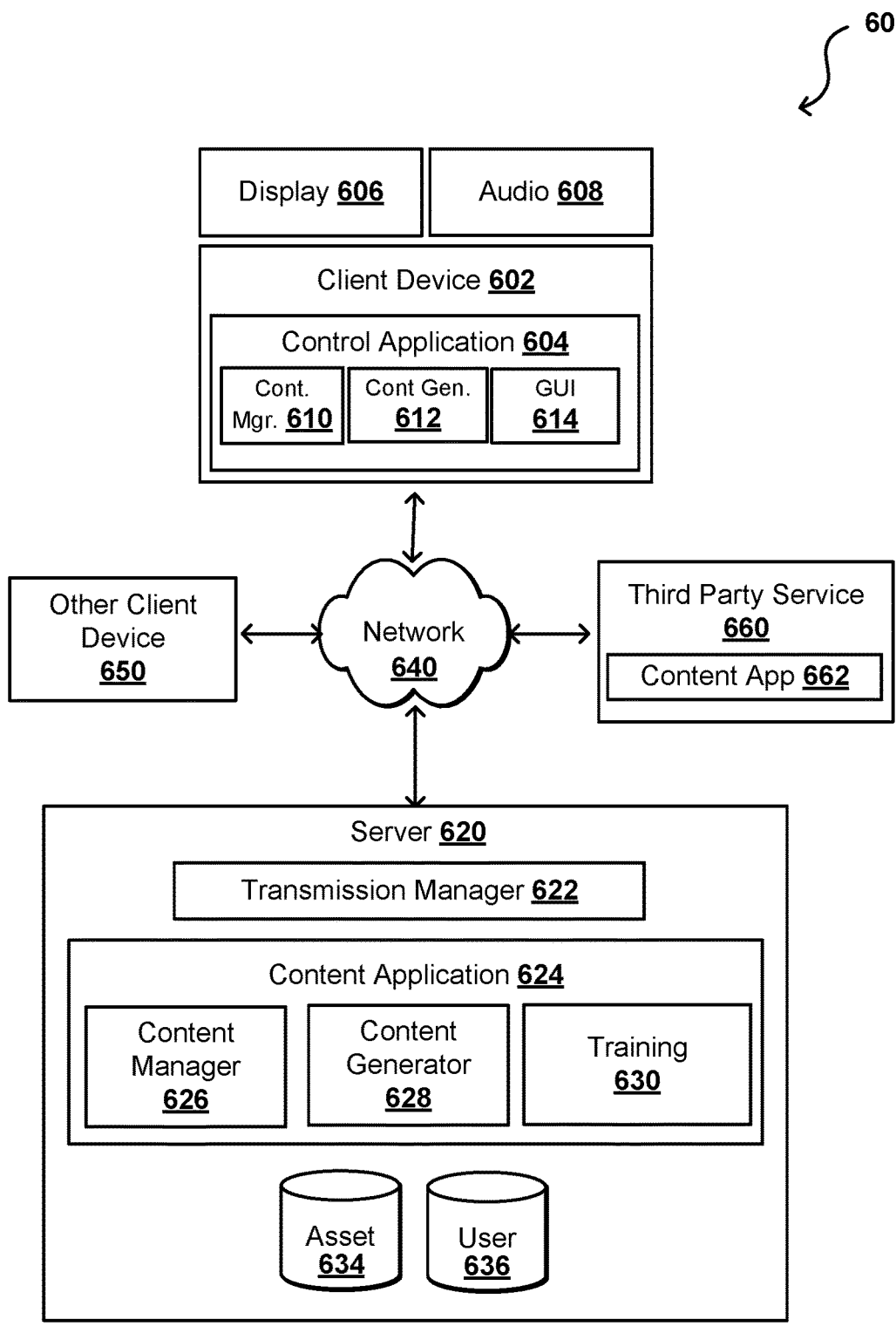
FIG. 6 illustrates components of a distributed system that can be used to perform content synthesis, according to at least one embodiment.

As an example, FIG. 6 illustrates an example networked system configuration 600 that can be used to provide, generate, modify, encode, process, and/or transmit image data or other such content. In at least one embodiment, a client device 602 can generate or receive data for a session using components of a control application 604 on a client device 602 and data stored locally on that client device. In at least one embodiment, a content application 624 executing on a server 620—such as a cloud server or edge server—may initiate a session associated with at least that client device 602, as may use a session manager and user data stored in a user database 636, and can cause content such as one or more object representations—such as one or more geometric meshes with density information—from an object repository 634 to be selected by a content manager 626 for processing. A content manager 626 may additionally, or alternatively, work with a content generator 628 to generate novel image content, such as images of objects of one or more classes for which the generator was trained using a training module 630. In at least one embodiment, this content generator 628 can receive random noise as input and generate an image of an object using a denoising process, where that process can be accelerated by using a second network that can infer a value for one or more higher order terms of a differential equation as presented herein. At least a portion of the generated content—which may correspond to a synthesized image or data useful in generating such an image—may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding control application 604, which may also or alternatively include a graphical user interface ("GUI") 614, content manager 610, and content generator 612 for use in selecting, providing, synthesizing, rendering, modifying, or using content for presentation (or other purposes) on or by the client device 602. A decoder may also be used to decode data received over the network 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network ("LAN"), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more VMs. In at least one embodiment, such a system can be implemented at least partially in a data center or at least partially using cloud computing resources.

Inference and Training Logic

Figure 7A:
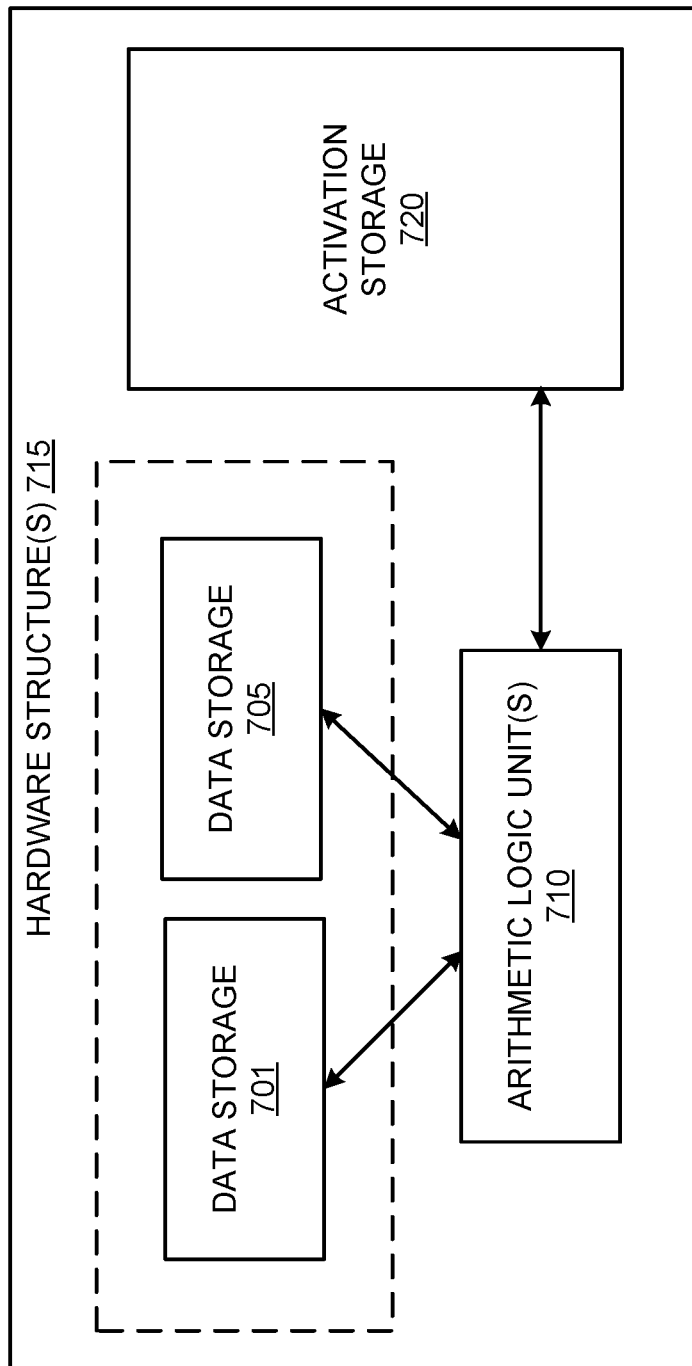
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic unit(s) ("ALU(s)"). In at least one embodiment, code, such as graph code, loads weight or other parameter information into processor ALU(s) based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (for example, Flash memory), or other storage. In at least one embodiment, choice of whether code and/or data storage 701 is internal or external to a processor, for example, or comprised of DRAM, SRAM, Flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, ALU(s)). In at least one embodiment, code, such as graph code, loads weight or other parameter information into processor ALU(s) based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (for example, Flash memory), or other storage. In at least one embodiment, choice of whether code and/or data storage 705 is internal or external to a processor, for example, or comprised of DRAM, SRAM, Flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (for example, graph code), a result of which may produce activations (for example, output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 701 and/or code and/or data storage 705 are used as operands along with other values, such as bias values, gradient information, momentum values, or other parameters or hyperparameters, any or all of which may be stored in code and/or data storage 701 or code and/or data storage 705 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (for example, a co-processor). In at least one embodiment, ALU(s) 710 may be included within a processor's execution units or otherwise within a bank of ALU(s) accessible by a processor's execution units either within same processor or distributed between different processors of different types (for example, CPUs, GPUs, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (for example, Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash memory or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit ("IPU") from Graphcore™, or a Nervana® (for example, "Lake Crest") processor from Intel Corp. In at least one embodiment, inference and/or training logic 715 illustrated in FIG. 7A may be used in conjunction with CPU hardware, GPU hardware or other hardware, such as field programmable gate arrays ("FPGAs").

Figure 7B:
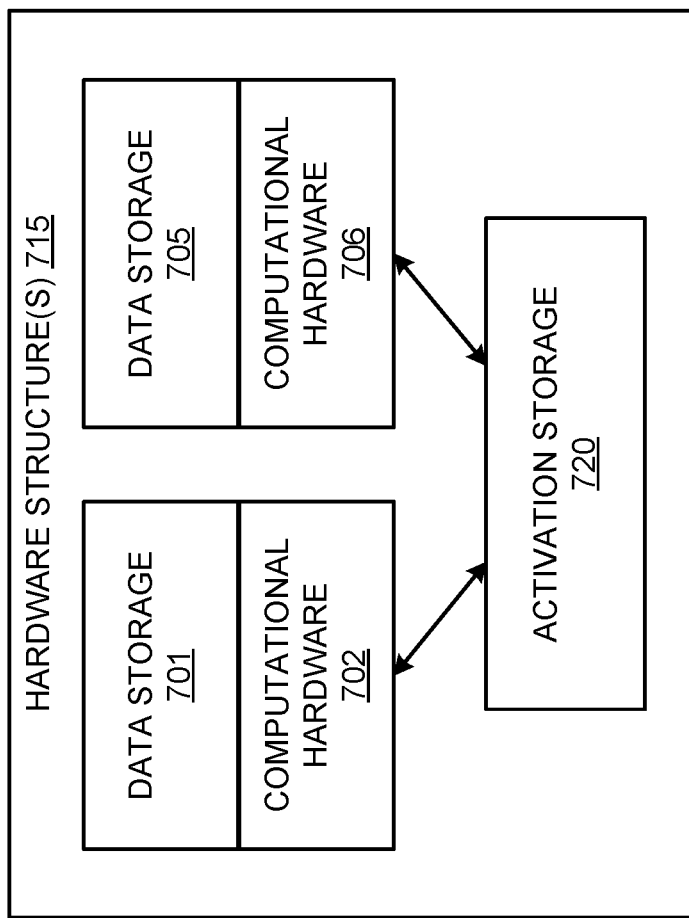
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an ASIC, such as Tensorflow® Processing Unit from Google, an IPU from Graphcore™, or a Nervana® (for example, "Lake Crest") processor from Intel Corp. In at least one embodiment, inference and/or training logic 715 illustrated in FIG. 7B may be used in conjunction with CPU hardware, GPU hardware or other hardware, such as FPGAs. In at least one embodiment, inference and/or training logic 715 includes, without limitation, code and/or data storage 701 and code and/or data storage 705, which may be used to store code (for example, graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALU(s) that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
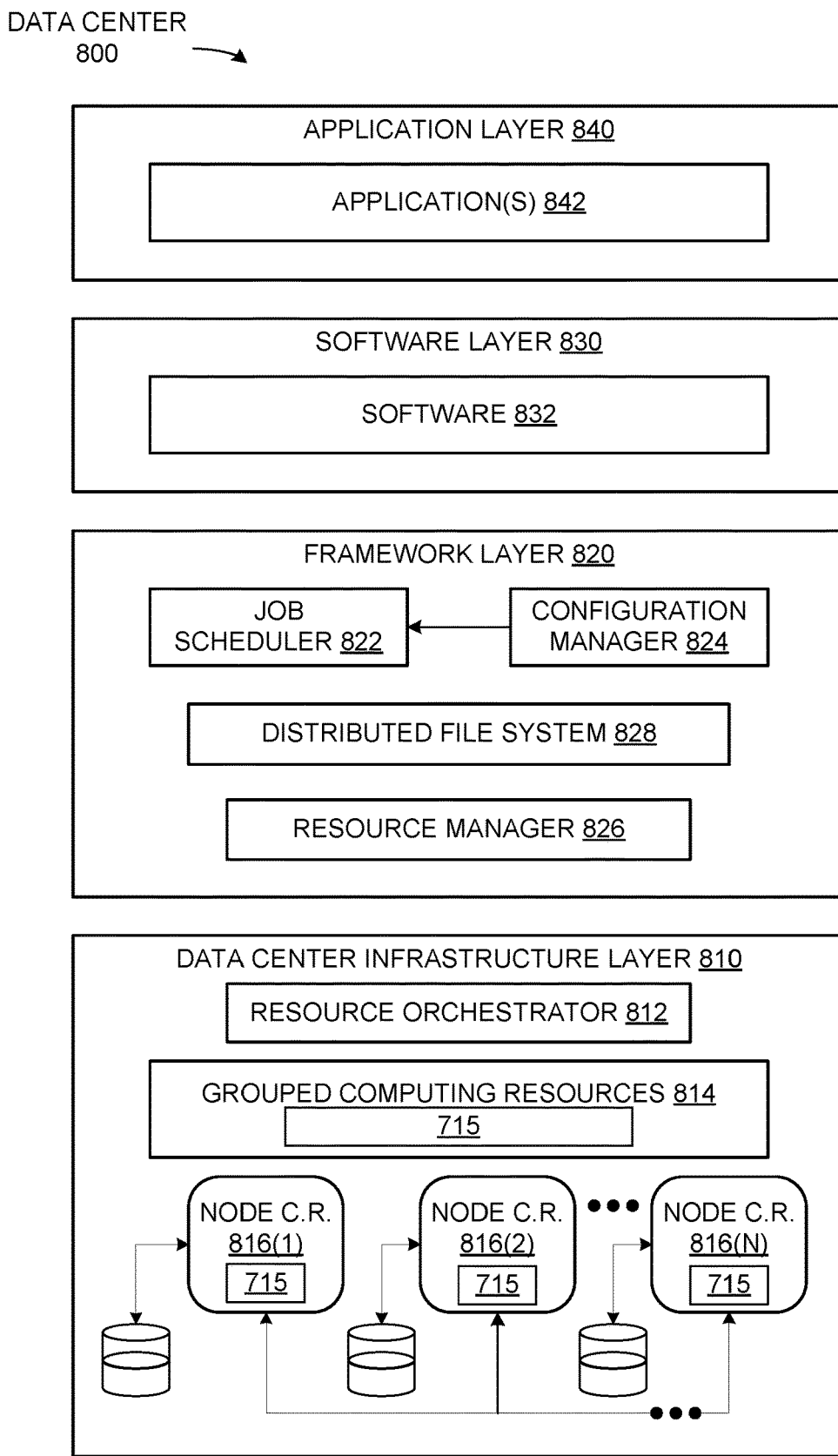
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of CPUs or other processors (including accelerators, FPGAs, graphics processors, etc.), memory devices (for example, dynamic read-only memory, storage devices (for example, solid state or disk drives), network input/output ("NW I/O") devices, network switches, VMs, power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826, and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud, and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (for example, "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (for example, PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, ASICs, GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence ("AI") services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to synthesize novel object images using a denoising diffusion model with a smaller second model to infer one or more higher order terms of a differential equation corresponding to the denoising process.

Computer Systems

Figure 9:
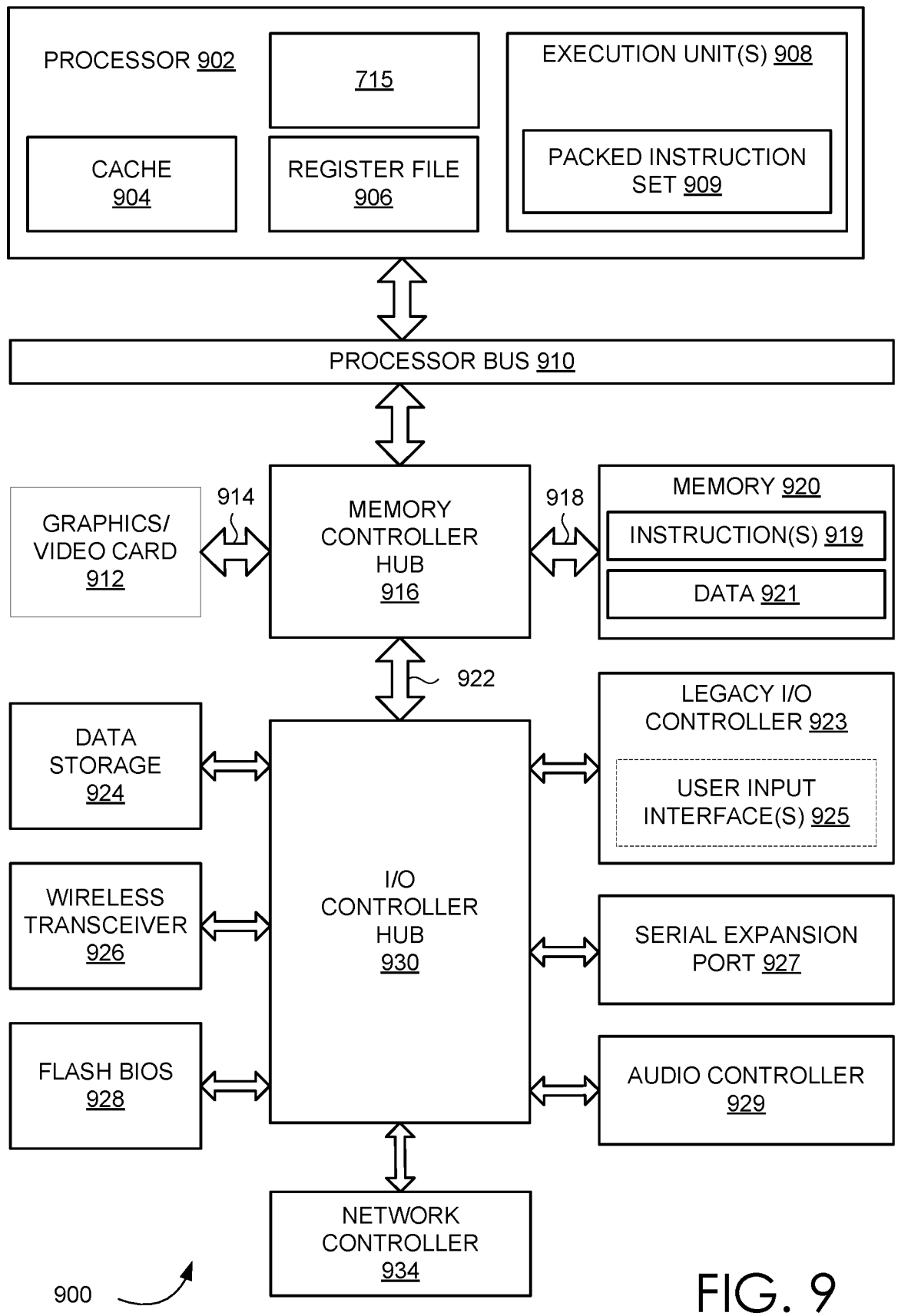
FIG. 9 illustrates a computer system, according to at least one embodiment.

FIG. 9 is a block diagram illustrating an exemplary computer system, which may be a system with interconnected devices and components, a system-on-a-chip ("SOC") or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), SOC, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution unit(s) 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word computing ("VLIW") microprocessor, a processor implementing a combination of instruction sets, or any other processor device, such as a DSP, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache 904 may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit(s) 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit(s) 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor data bus 910 for performing operations on packed data, which may eliminate need to transfer smaller units of data across processor data bus 910 to perform one or more operations one data element at a time.

In at least one embodiment, execution unit(s) 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a DRAM device, a SRAM device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input interface(s) 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary SOC. In at least one embodiment, devices may be interconnected with proprietary interconnects, standardized interconnects (for example, PCIe) or some combination thereof. In at least one embodiment, one or more components of computer system 900 are interconnected using compute express link ("CXL") interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to synthesize novel object images using a denoising diffusion model with a smaller second model to infer one or more higher order terms of a differential equation corresponding to the denoising process.

Figure 10:
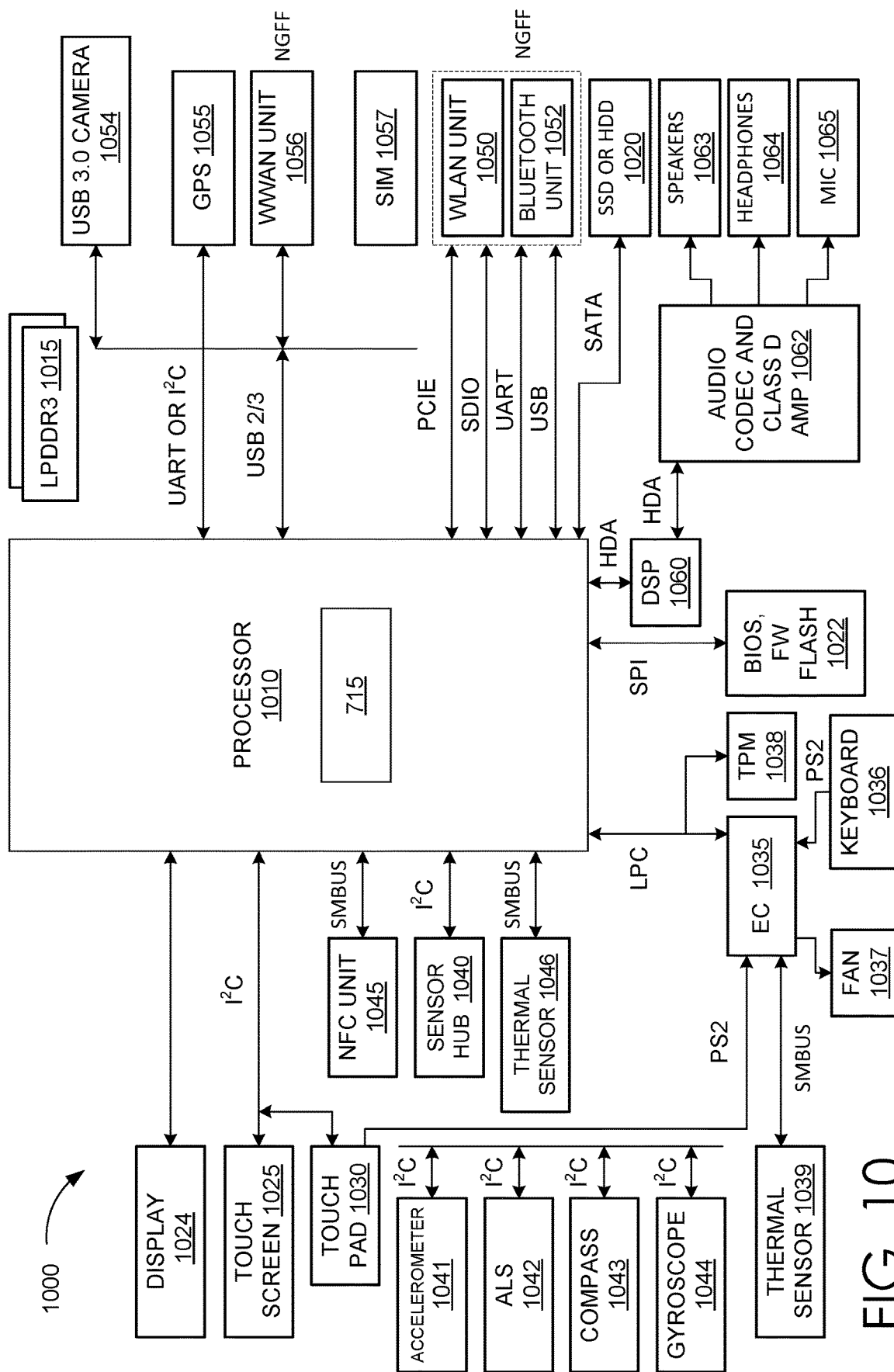
FIG. 10 illustrates a computer system, according to at least one embodiment.

FIG. 10 is a block diagram illustrating an electronic device 1000 for using a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, an USB (versions 1, 2, 3), or an Universal Asynchronous Receiver/Transmitter ("UART") bus. In at least one embodiment, FIG. 10 illustrates an electronic device 1000, which includes interconnected hardware devices or "chips", whereas in other embodiments, FIG. 10 may illustrate an exemplary SOC. In at least one embodiment, devices illustrated in FIG. 10 may be interconnected with proprietary interconnects, standardized interconnects (for example, PCIe) or some combination thereof. In at least one embodiment, one or more components of FIG. 10 are interconnected using CXL interconnects.

In at least one embodiment, FIG. 10 may include a display 1024, a touch screen 1025, a touch pad 1030, a Near Field Communications ("NFC") unit 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network ("WLAN") unit 1050, a Bluetooth unit 1052, a Wireless Wide Area Network ("WWAN") unit 1056, a Global Positioning System ("GPS") 1055, a camera ("USB 3.0 camera") 1054 such as an USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to synthesize novel object images using a denoising diffusion model with a smaller second model to infer one or more higher order terms of a differential equation corresponding to the denoising process.

Figure 11:
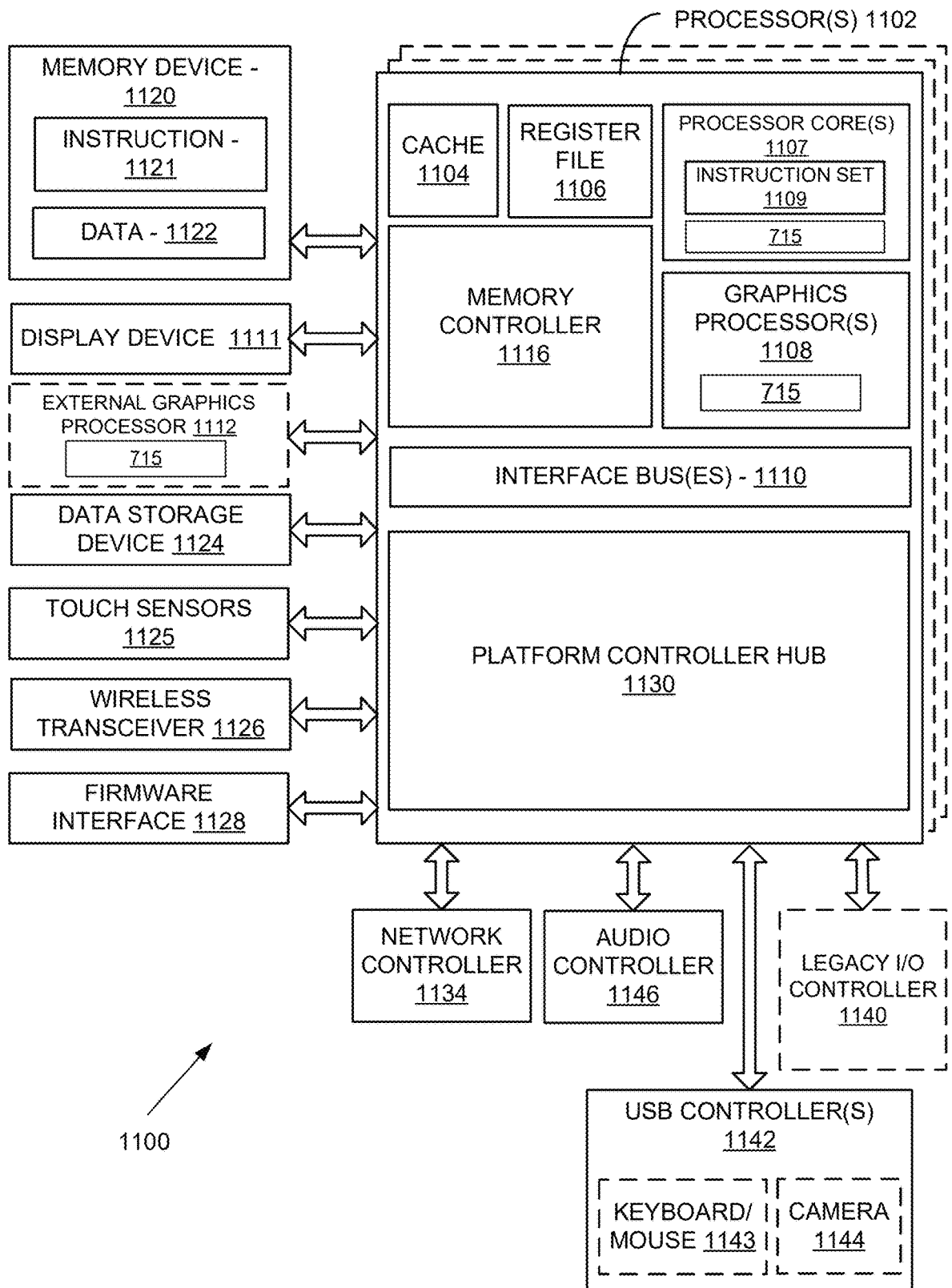
FIG. 11 illustrates at least portions of a graphics processor, according to one or more embodiments.

FIG. 11 is a block diagram of a processing system, according to at least one embodiment. In at least one embodiment, system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, system 1100 is a processing platform incorporated within a SoC integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, coupled with, or be integrated within a wearable device, such as a smart watch wearable device, smart eyewear device, AR device, or VR device. In at least one embodiment, processing system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate CISC, RISC, or computing via a VLIW. In at least one embodiment, processor core(s) 1107 may each process a different instruction set 1109, which may include instructions to facilitate emulation of other instruction sets. In at least one embodiment, processor core(s) 1107 may also include other processing devices, such a DSP.

In at least one embodiment, processor(s) 1102 includes cache memory ("cache") 1104. In at least one embodiment, processor(s) 1102 can have a single internal cache or multiple levels of internal cache. In at least one embodiment, cache memory is shared among various components of processor(s) 1102. In at least one embodiment, processor(s) 1102 also uses an external cache (for example, a Level-3 ("L3") cache or Last Level Cache ("LLC")) (not shown), which may be shared among processor core(s) 1107 using known cache coherency techniques. In at least one embodiment, register file 1106 is additionally included in processor(s) 1102 which may include different types of registers for storing different types of data (for example, integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in system 1100. In at least one embodiment, interface bus(es) 1110, in one embodiment, can be a processor bus, such as a version of a Direct Media Interface ("DMI") bus. In at least one embodiment, interface bus(es) 1110 is not limited to a DMI bus, and may include one or more Peripheral Component Interconnect buses (for example, PCI, PCI Express), memory buses, or other types of interface buses. In at least one embodiment processor(s) 1102 include an integrated memory controller 1116 and a platform controller hub ("PCH") 1130. In at least one embodiment, memory controller 1116 facilitates communication between a memory device 1120 and other components of system 1100, while PCH 1130 provides connections to I/O devices via a local I/O bus.

In at least one embodiment, memory device 1120 can be a DRAM device, a SRAM device, a flash memory device, a phase-change memory device, or some other memory device having suitable performance to serve as process memory. In at least one embodiment memory device 1120 can operate as system memory for system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (for example, DisplayPort, etc.). In at least one embodiment, display device 1111 can include a head mounted display ("HMD") such as a stereoscopic display device for use in VR applications or AR applications.

In at least one embodiment, PCH 1130 allows peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (for example, a hard disk drive, a flash memory, etc.). In at least one embodiment, data storage device 1124 can connect via a storage interface (for example, SATA) or via a peripheral bus, such as a Peripheral Component Interconnect bus (for example, PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution ("LTE") transceiver. In at least one embodiment, firmware interface 1128 allows communication with system firmware, and can be, for example, a unified extensible firmware interface ("UEFI"). In at least one embodiment, network controller 1134 can allow a network connection to a wired network. In at least one embodiment, a high-performance network controller (not shown) couples with interface bus(es) 1110. In at least one embodiment, audio controller 1146 is a multi-channel high definition audio controller. In at least one embodiment, system 1100 includes an optional legacy I/O controller 1140 for coupling legacy (for example, Personal System 2 ("PS/2")) devices to system. In at least one embodiment, PCH 1130 can also connect to one or more USB controller(s) 1142 connect input devices, such as keyboard and mouse 1143 combinations, a camera 1144, or other USB input devices.

In at least one embodiment, an instance of memory controller 1116 and PCH 1130 may be integrated into a discreet external graphics processor, such as external graphics processor 1112. In at least one embodiment, PCH 1130 and/or memory controller 1116 may be external to one or more processor(s) 1102. For example, in at least one embodiment, system 1100 can include an external memory controller 1116 and PCH 1130, which may be configured as a MCH and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALU(s) embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALU(s) of a graphics processor to perform one or more machine learning algorithms, neural network architectures, use cases, or training techniques described herein.

Such components can be used to synthesize novel object images using a denoising diffusion model with a smaller second model to infer one or more higher order terms of a differential equation corresponding to the denoising process.

Figure 12:
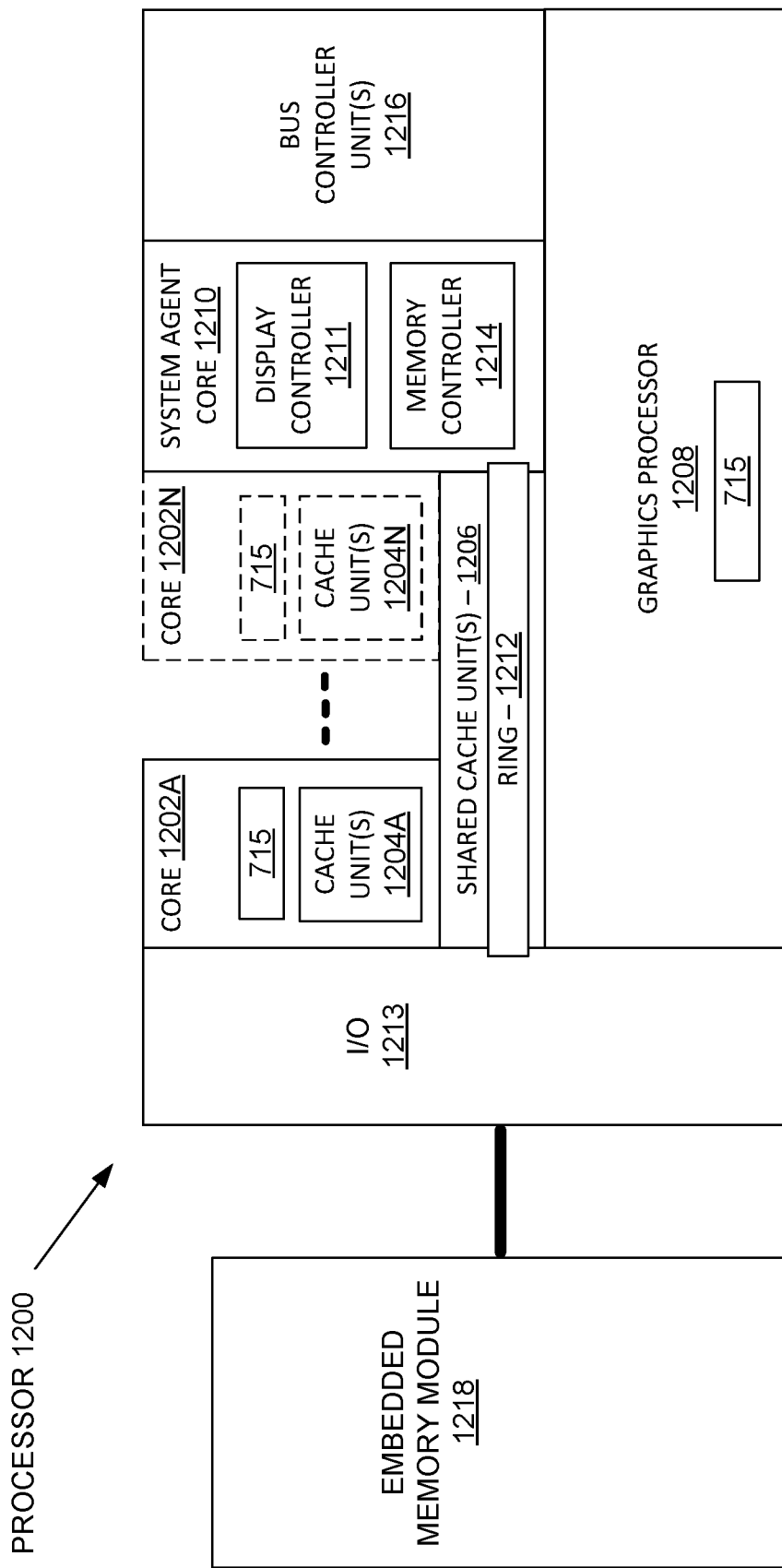
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache memory unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express buses. In at least one embodiment, system agent core 1210 provides management functionality for various processor components. In at least one embodiment, system agent core 1210 includes one or more integrated memory controller(s) 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit ("PCU"), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controller(s) 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory module 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture ("ISA"), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as a SOC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALU(s) embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALU(s) of graphics processor 1200 to perform one or more machine learning algorithms, neural network architectures, use cases, or training techniques described herein.

Such components can be used to synthesize novel object images using a denoising diffusion model with a smaller second model to infer one or more higher order terms of a differential equation corresponding to the denoising process.

Virtualized Computing Platform

Figure 13:
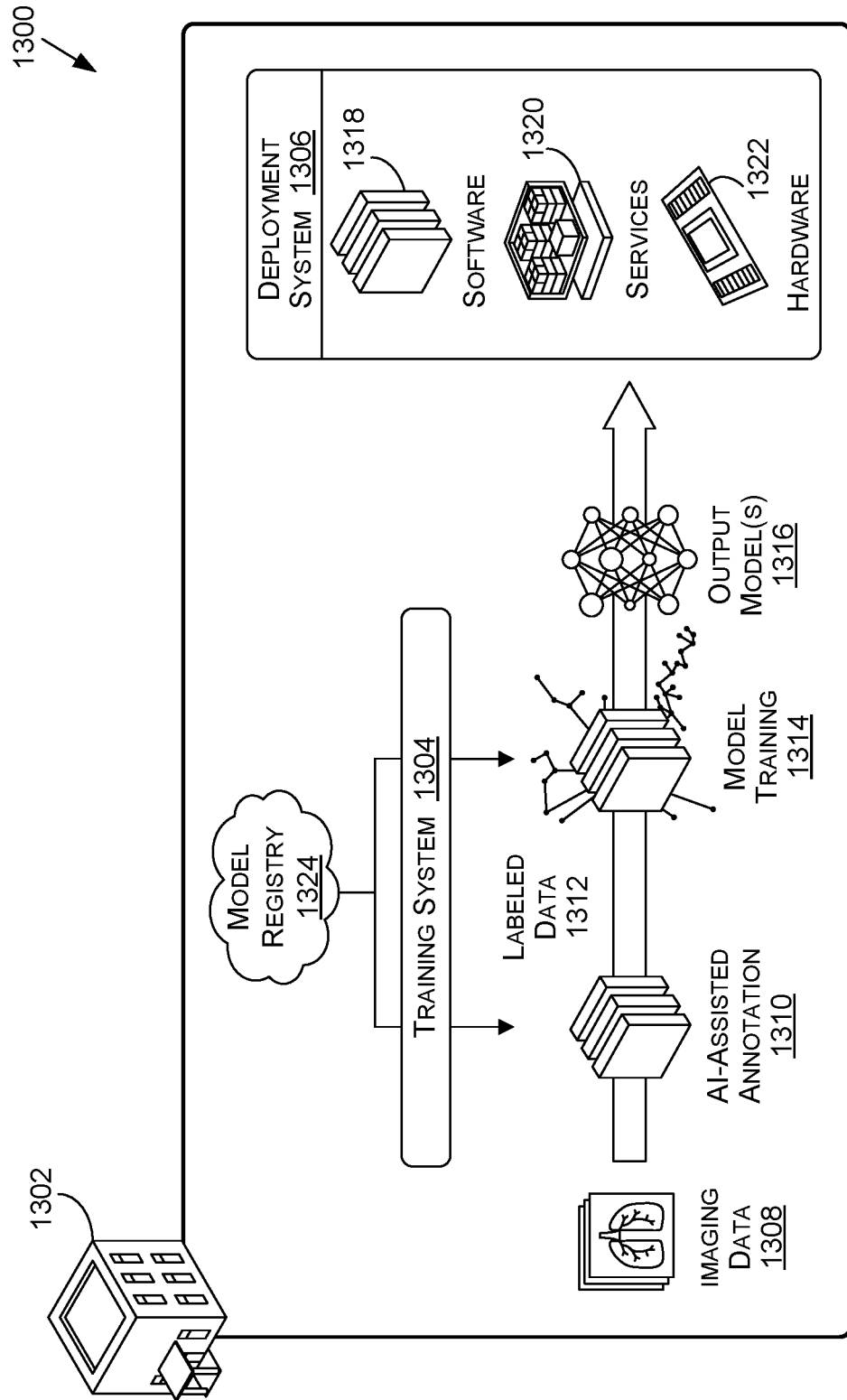
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facility(ies) 1302. Process 1300 may be executed within a training system 1304 and/or a deployment system 1306. In at least one embodiment, training system 1304 may be used to perform training, deployment, and implementation of machine learning models (for example, neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility(ies) 1302. In at least one embodiment, one or more applications in a pipeline may use or call upon services (for example, inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility(ies) 1302 using data 1308 (such as imaging data) generated at facility(ies) 1302 (and stored on one or more picture archiving and communication system ("PACS") servers at facility(ies) 1302), may be trained using imaging or sequencing data 1308 from another facility(ies) 1302, or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface ("API") from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1304 (FIG. 13) may include a scenario where facility(ies) 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (for example, convolutional neural networks ("CNNs")) that may be trained to generate annotations corresponding to certain types of imaging data 1308 (for example, from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data

1312, or a combination thereof may be used as ground truth data for training a machine learning model. In at least one embodiment, a trained machine learning model may be referred to as output model(s) 1316, and may be used by deployment system 1306, as described herein.

In at least one embodiment, a training pipeline may include a scenario where facility(ies) 1302 needs a machine learning model for use in performing one or more processing tasks for one or more applications in deployment system 1306, but facility(ies) 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility(ies) 1302 (for example, facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility(ies) 1302 requiring a machine learning model for use in performing one or more processing tasks for one or more applications in deployment system 1306, but facility(ies) 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility(ies) 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314 (for example, AI-assisted annotation 1310, labeled clinic data 1312, or a combination thereof) may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (for example, inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility(ies) 1302 after processing through a pipeline (for example, to convert outputs back to a usable data type). In at least one embodiment, a combination of containers within software 1318 (for example, that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (for example, imaging data 1308) in a specific format in response to an inference request (for example, a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (for example, as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (for example, limited access) area of a container registry (described in more detail herein), and trained or deployed models may be stored in model registry 1324 and associated with one or more applications. In at least one embodiment, images of applications (for example, container images) may be available in a container registry, and once selected by a user from a container registry for deployment in a pipeline, an image may be used to generate a container for an instantiation of an application for use by a user's system.

In at least one embodiment, developers (for example, software developers, clinicians, doctors, etc.) may develop, publish, and store applications (for example, as containers) for performing image processing and/or inferencing on supplied data. In at least one embodiment, development, publishing, and/or storing may be performed using a software development kit ("SDK") associated with a system (for example, to ensure that an application and/or container developed is compliant with or compatible with a system). In at least one embodiment, an application that is developed may be tested locally (for example, at a first facility, on data from a first facility) with a SDK which may support at least some of services 1320 as a system (for example, system 1200 of FIG. 12). In at least one embodiment, because DICOM objects may contain anywhere from one to hundreds of images or other data types, and due to a variation in data, a developer may be responsible for managing (for example, setting constructs for, building pre-processing into an application, etc.) extraction and preparation of incoming data. In at least one embodiment, once validated by system 1300 (for example, for accuracy), an application may be available in a container registry for selection and/or implementation by a user to perform one or more processing tasks with respect to data at a facility (for example, a second facility) of a user.

In at least one embodiment, developers may then share applications or containers through a network for access and use by users of a system (for example, system 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (for example, a cloud) to perform processing of data processing pipeline. In at least one embodiment, processing by deployment system 1306 may include referencing selected elements (for example, applications, containers, models, etc.) from a container registry and/or model registry 1324. In at least one embodiment, once results are generated by a pipeline, results may be returned to a user for reference (for example, for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, AI services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (for example, using a parallel computing platform). In at least one embodiment, rather than each application that shares a same functionality offered by services 1320 being required to have a respective instance of services 1320, services 1320 may be shared between and among various applications. In at least one embodiment, services 1320 may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (for example, DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional ("2D") and/or 3D models. In at least one embodiment, virtual instrument services may be included that provide for beam-forming, segmentation, inferencing, imaging, and/or support for other applications within pipelines of virtual instruments.

In at least one embodiment, where services 1320 includes an AI service (for example, an inference service), one or more machine learning models may be executed by calling upon (for example, as an API call) an inference service (for example, an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (for example, an AI supercomputer, such as NVIDIA's DGX Systems), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (for example, at facility (ies) 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (for example, hardware and software combination of NVIDIA's DGX Systems). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (for example, NVIDIA's NGC) may be executed using an AI/deep learning supercomputer(s) and/or GPU-optimized software (for example, as provided on NVIDIA's DGX Systems) as a hardware abstraction and scaling platform. In at least one embodiment, cloud platform may integrate an application container clustering system or orchestration system (for example, KUBERNETES) on multiple GPUs to allow seamless scaling and load balancing.

Figure 14:
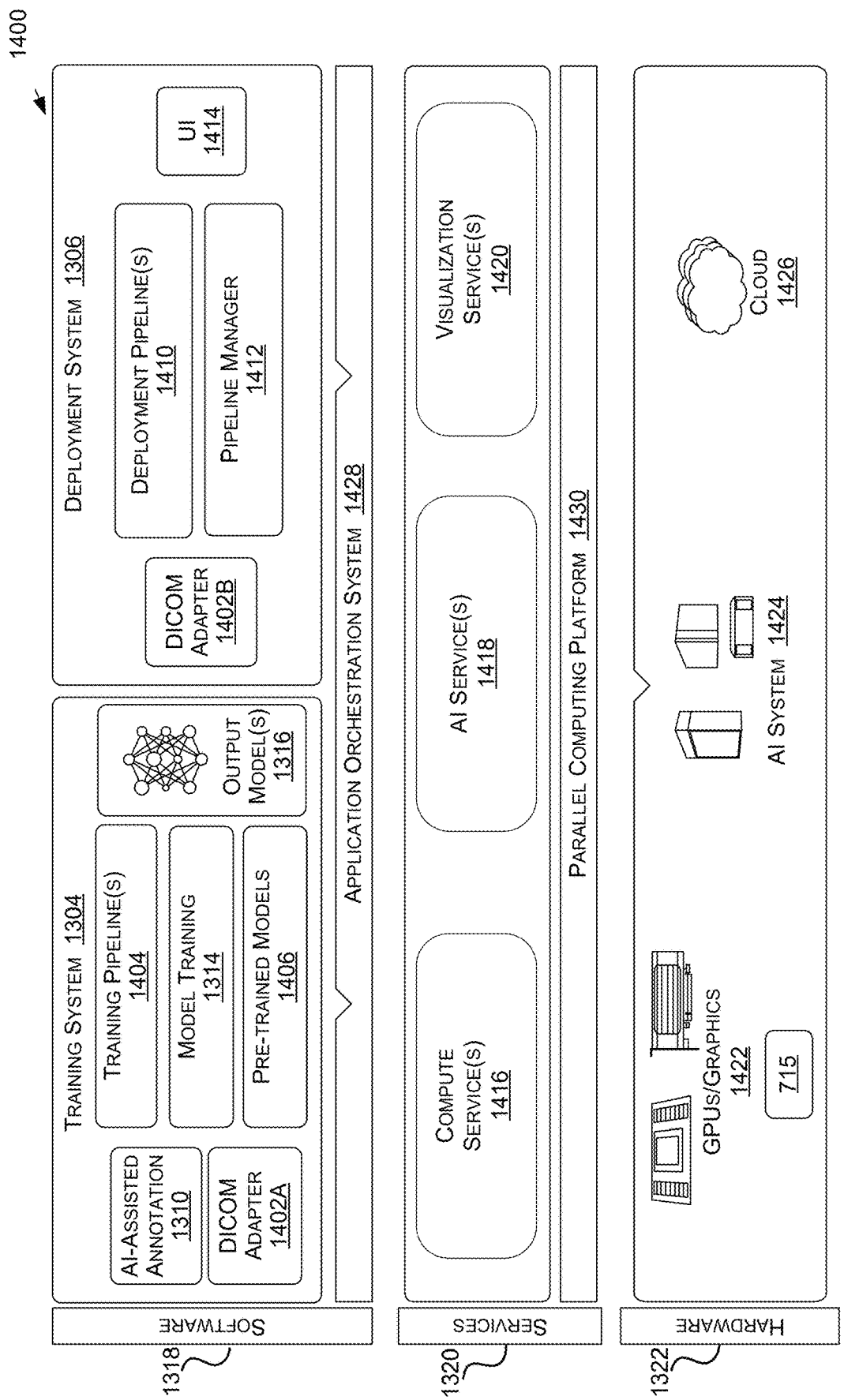
FIG. 14 is a system diagram for an example system for training, adapting, instantiating, and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (for example, training system 1304 and/or deployment system 1306) may implemented in a cloud computing environment (for example, using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (for example, AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to LANs and/or WANs via wired and/or wireless communication protocols. In at least one embodiment, communication between facilities and components of system 1400 (for example, for transmitting inference requests, for receiving results of inference requests, etc.) may be communicated over data bus(ses), wireless data protocols (Wi-Fi), wired data protocols (for example, Ethernet), etc.

In at least one embodiment, training system 1304 may execute training pipeline(s) 1404, similar to those described herein with respect to FIG. 13. In at least one embodiment, where one or more machine learning models are to be used in deployment pipeline(s) 1410 by deployment system 1306, training pipeline(s) 1404 may be used to train or retrain one or more (for example, pre-trained) models, and/or implement one or more of pre-trained model(s) 1406 (for example, without a need for retraining or updating). In at least one embodiment, as a result of training pipeline(s) 1404, output model(s) 1316 may be generated. In at least one embodiment, training pipeline(s) 1404 may include any number of processing steps, such as but not limited to imaging data (or other input data) conversion or adaption In at least one embodiment, for different machine learning models used by deployment system 1306, different training pipeline(s) 1404 may be used. In at least one embodiment, training pipeline(s) 1404 similar to a first example described with respect to FIG. 13 may be used for a first machine learning model, training pipeline(s) 1404 similar to a second example described with respect to FIG. 13 may be used for a second machine learning model, and training pipeline(s) 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines ("SVM"), Naïve Bayes, k-nearest neighbor ("Knn"), K means clustering, random forest, dimensionality reduction algorithms, gradient boosting algorithms, neural networks (for example, auto-encoders, convolutional, recurrent, perceptrons, Long/Short Term Memory ("LSTM"), Hopfield, Boltzmann, deep belief, deconvolutional, generative adversarial, liquid state machine, etc.), and/or other types of machine learning models.

In at least one embodiment, training pipeline(s) 1404 may include AI-assisted annotation, as described in more detail herein with respect to at least FIG. 14. In at least one embodiment, labeled data 1312 (for example, traditional annotation) may be generated by any number of techniques. In at least one embodiment, labels or other annotations may be generated within a drawing program (for example, an annotation program), a computer aided design ("CAD") program, a labeling program, another type of program suitable for generating annotations or labels for ground truth, and/or may be hand drawn, in some examples. In at least one embodiment, ground truth data may be synthetically produced (for example, generated from computer models or renderings), real produced (for example, designed and produced from real-world data), machine-automated (for example, using feature analysis and learning to extract features from data and then generate labels), human annotated (for example, labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation 1310 may be performed as part of deployment pipeline(s) 1410; either in addition to, or in lieu of AI-assisted annotation 1310 included in training pipeline(s) 1404. In at least one embodiment, system 1400 may include a multi-layer platform that may include a software layer (for example, software 1318) of diagnostic applications (or other application types) that may perform one or more medical imaging and diagnostic functions. In at least one embodiment, system 1400 may be communicatively coupled to (for example, via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (for example, called) from an external environment(s) (for example, facility(ies) 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline(s) 1410 for an individual device may be referred to as a virtual instrument for a device (for example, a virtual ultrasound instrument, a virtual CT scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an MRI machine, there may be a first deployment pipeline(s) 1410, and where image enhancement is desired from output of an MM machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (for example, a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (for example, Kubernetes, DOCKER, etc.) may include a container orchestration system that may group applications into containers as logical units for coordination, management, scaling, and deployment. In at least one embodiment, by associating applications from deployment pipeline(s) 1410 (for example, a reconstruction application, a segmentation application, etc.) with individual containers, each application may execute in a self-contained environment (for example, at a kernel level) to increase speed and efficiency.

In at least one embodiment, each application and/or container (or image thereof) may be individually developed, modified, and deployed (for example, a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (for example, based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (for example, user constraints), such as quality of service (QoS), urgency of need for data outputs (for example, to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (for example, execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (for example, using a parallel computing platform 1430) for processing data through one or more of applications and/or one or more tasks of a single application, substantially simultaneously. In at least one embodiment, parallel computing platform 1430 (for example, NVIDIA's CUDA) may allow general purpose computing on GPUs ("GPGPU") (for example, GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (for example, where multiple different stages of an application or multiple applications are processing same information). In at least one embodiment, rather than making a copy of data and moving data to different locations in memory (for example, a read/write operation), same data in same location of a memory may be used for any number of processing tasks (for example, at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (for example, tasked with performing one or more processing tasks of an application). In at least one embodiment, AI service(s) 1418 may leverage AI system 1424 to execute machine learning model(s) (for example, neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (for example, a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (for example, services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (for example, for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (for example, shared storage), and/or a copy of a model may be saved to a cache. In at least one embodiment, a scheduler (for example, of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (for example, hosting an instance of an inference server) may be loaded (if not already), and a start procedure may be called. In at least one embodiment, pre-processing logic in a container may load, decode, and/or perform any additional pre-processing on incoming data (for example, using a CPU(s) and/or GPU(s)). In at least one embodiment, once data is prepared for inference, a container may perform inference as necessary on data. In at least one embodiment, this may include a single inference call on one image (for example, a hand X-ray), or may require inference on hundreds of images (for example, a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (for example, TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a SDK, and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, VR displays, AR displays, etc. In at least one embodiment, virtualized environments may be used to generate a virtual interactive display or environment (for example, a virtual environment) for interaction by users of a system (for example, doctors, nurses, radiologists, etc.). In at least one embodiment, visualization service(s) 1420 may include an internal visualizer, cinematics, and/or other rendering or image processing capabilities or functionality (for example, ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (for example, NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (for example, to execute machine learning models). In at least one embodiment, cloud 1426, AI system 1424, and/or other components of system 1400 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (for example, a supercomputer or an HPC) configured for inferencing, deep learning, machine learning, and/or other AI tasks. In at least one embodiment, AI system 1424 (for example, NVIDIA's DGX Systems) may include GPU-optimized software (for example, a software stack) that may be executed using a plurality of GPUs/Graph 1422, in addition to CPUs, RAM, storage, and/or other components, features, or functionality. In at least one embodiment, one or more AI systems 1424 may be implemented in cloud 1426 (for example, in a data center) for performing some or all of AI-based processing tasks of system 1400.

In at least one embodiment, cloud 1426 may include a GPU-accelerated infrastructure (for example, NVIDIA's NGC) that may provide a GPU-optimized platform for executing processing tasks of system 1400. In at least one embodiment, cloud 1426 may include an AI system(s) 1424 for performing one or more of AI-based tasks of system 1400 (for example, as a hardware abstraction and scaling platform). In at least one embodiment, cloud 1426 may integrate with application orchestration system 1428 leveraging multiple GPUs to allow seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (for example, executing NVIDIA's TENSOR RT), provide a parallel computing platform 1430 (for example, NVIDIA's CUDA), execute application orchestration system 1428 (for example, KUBERNETES), provide a graphics rendering API and platform (for example, for ray-tracing, 2D graphics, 3D graphics, and/or other rendering techniques to produce higher quality cinematics), and/or may provide other functionality for system 1400.

Figure 15A:
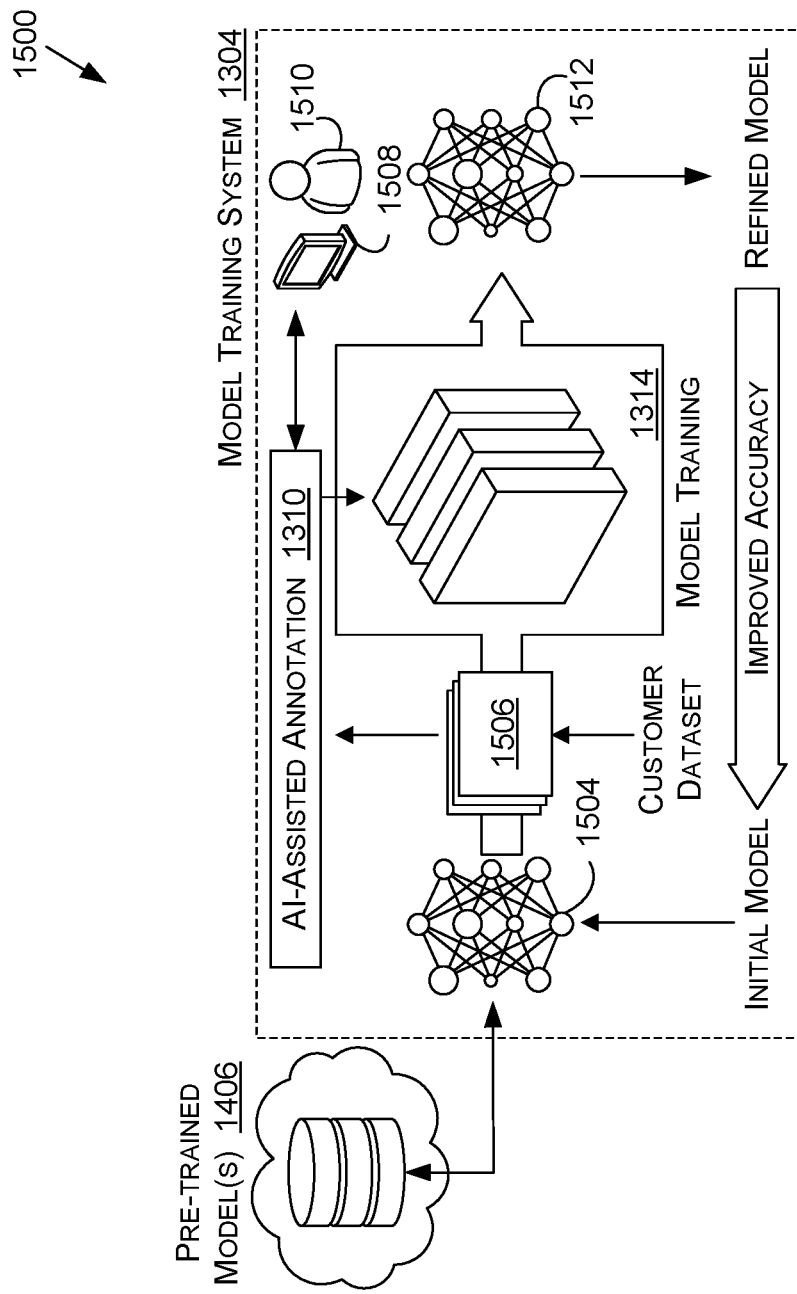
FIGS. 15A and 15B illustrate a data flow diagram for a process to train a machine learning model, as well as client-server architecture to enhance annotation tools with pre-trained annotation models, in accordance with at least one embodiment.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services and/or hardware as described herein. In at least one embodiment, refined model 1512 generated by process 1500 may be executed by a deployment system for one or more containerized applications in deployment pipelines.

In at least one embodiment, model training 1514 may include retraining or updating an initial model 1504 (for example, a pre-trained model) using new training data (for example, new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (for example, weights and/or biases) that remain from prior training, so training or retraining may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained model(s) 1406 may be stored in a data store, or registry. In at least one embodiment, pre-trained model(s) 1406 may have been trained, at least in part, at one or more facilities other than a facility executing process 1500. In at least one embodiment, to protect privacy and rights of patients, subjects, or clients of different facilities, pre-trained model(s) 1406 may have been trained, on-premise, using customer or patient data generated on-premise. In at least one embodiment, pre-trained model(s) 1406 may be trained using a cloud and/or other hardware, but confidential, privacy protected patient data may not be transferred to, used by, or accessible to any components of a cloud (or other off premise hardware). In at least one embodiment, where pre-trained model(s) 1406 is trained at using patient data from more than one facility, pre-trained model(s) 1406 may have been individually trained for each facility prior to being trained on patient or customer data from another facility. In at least one embodiment, such as where a customer or patient data has been released of privacy concerns (for example, by waiver, for experimental use, etc.), or where a customer or patient data is included in a public data set, a customer or patient data from any number of facilities may be used to train pre-trained model(s) 1406 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select pre-trained model(s) 1406 to use with an application. In at least one embodiment, pre-trained model may not be optimized for generating accurate results on customer dataset 1506 of a facility of a user (for example, based on patient diversity, demographics, types of medical imaging devices used, etc.). In at least one embodiment, prior to deploying a pre-trained model into a deployment pipeline for use with an application(s), pre-trained model(s) 1406 may be updated, retrained, and/or fine-tuned for use at a respective facility.

In at least one embodiment, a user may select pre-trained model(s) 1406 that is to be updated, retrained, and/or fine-tuned, and this pre-trained model may be referred to as initial model 1504 for a training system within process 1500. In at least one embodiment, a customer dataset 1506 (for example, imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by model training system 1304. In at least one embodiment, ground truth data may be generated, at least in part, by clinicians, scientists, doctors, practitioners, at a facility.

In at least one embodiment, AI-assisted annotation 1310 may be used in some examples to generate ground truth data. In at least one embodiment, AI-assisted annotation 1310 (for example, implemented using an AI-assisted annotation SDK) may leverage machine learning models (for example, neural networks) to generate suggested or predicted ground truth data for a customer dataset. In at least one embodiment, a user may use annotation tools within a user interface (a GUI) on a computing device.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (for example, from AI-assisted annotation 1310, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained model(s) 1542 in a model registry to be selected by another facility. In at least one embodiment, this process may be completed at any number of facilities such that refined model 1512 may be further refined on new datasets any number of times to generate a more universal model.

Figure 15B:
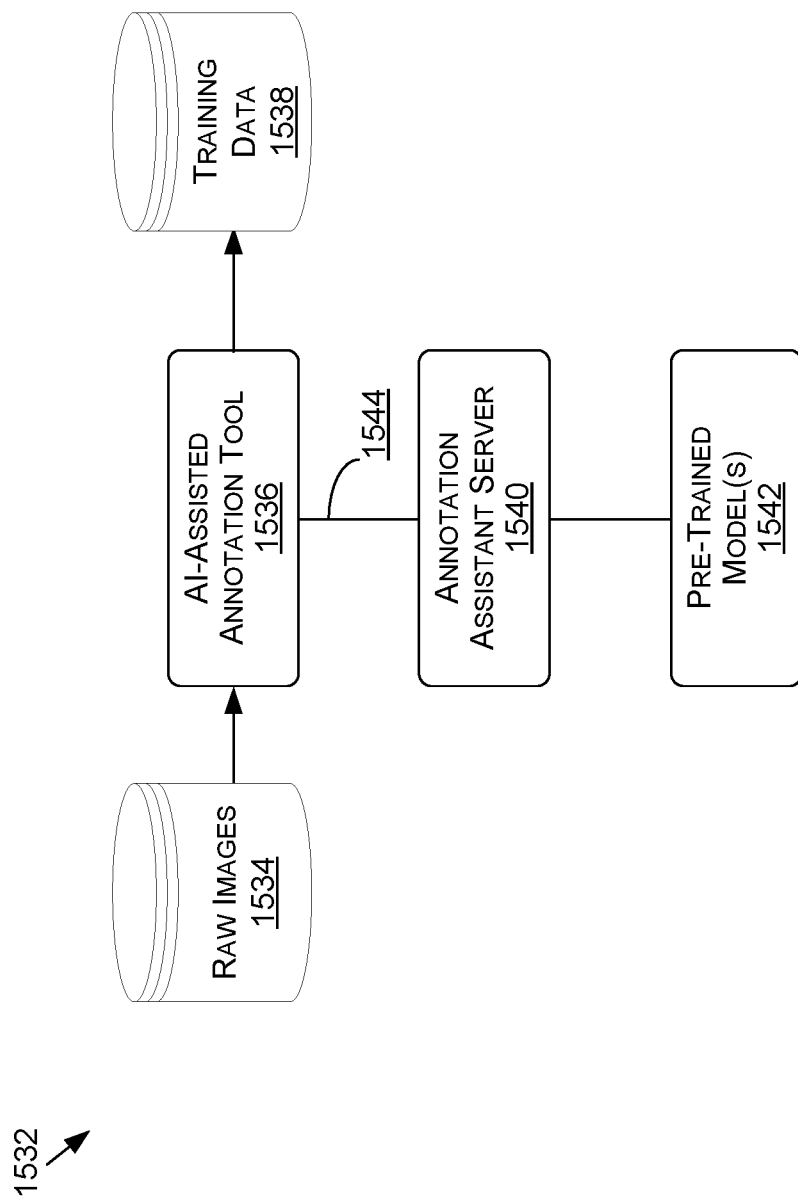

FIG. 15B is an example illustration of a client-server architecture 1532 to enhance annotation tools with pre-trained model(s) 1542, in accordance with at least one embodiment. In at least one embodiment, AI-assisted annotation tool 1536 may be instantiated based on a client-server architecture 1532. In at least one embodiment, AI-assisted annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (for example, in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (for example, API Call 1544) to a server, such as an annotation assistant server 1540 that may include a set of pre-trained model(s) 1542 stored in an annotation model registry, for example. In at least one embodiment, an annotation model registry may store pre-trained model(s) 1542 (for example, machine learning models, such as deep learning models) that are pre-trained to perform AI-assisted annotation 1310 on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:
   providing a representation of an input noise image to a neural network;
   receiving, from the neural network, a curvature of an ordinary differential equation (ODE) to be used by a diffusion model to denoise the input noise image;
   denoising the input noise image, over a number of denoising iterations, based at least on the curvature of the ODE; and
   generating, using the diffusion model, a synthesized image representing at least one object.

2. The computer-implemented method of clause 1, wherein the diffusion model is a first order score-based generative model.

3. The computer-implemented method of clause 1, further comprising:
determining, by the neural network, the ODE curvature according to a derivative term of the ODE function.

4. The computer-implemented method of clause 3, wherein the neural network is to infer one or more Jacobian-vector products indicative of the curvature.

5. The computer-implemented method of clause 1, wherein the representation of the input noise image includes at least a representation of the input image extracted at a last feature layer of the diffusion model together with a time embedding.

6. The computer-implemented method of clause 1, wherein the neural network requires less memory to instantiate than the diffusion network and uses a diffusion model architecture or a convolutional neural network architecture with one or more residual blocks.

7. The computer-implemented method of clause 1, wherein the curvature, defined by a higher-order derivative of the ODE function, corresponds to a denoising trajectory from the input noise image to output image data for the synthesized image.

8. A processor, comprising:
one or more circuits to:
provide an input noise image to a diffusion model;
provide the input noise image to a separate neural network;
receive, from the neural network, an approximation of the curvature of an ordinary differential equation (ODE) to be used by the diffusion model to denoise the input noise image;
denoise the input noise image, over a number of denoising iterations, using steps determined according to the curvature data; and
generate, as output, a synthesized image representing at least one object.

9. The processor of clause 8, wherein the diffusion model is a first order score-based generative model.

10. The processor of clause 8, wherein the one or more circuits are further to:
determine by the neural network, the ODE curvature data according to a derivative term of the ODE function.

11. The processor of clause 8, wherein the neural network is to infer one or more Jacobian-vector products indicative of the curvature.

12. The processor of clause 8, wherein the neural network requires less memory to instantiate than the diffusion network and uses a diffusion model architecture or a convolutional neural network architecture with one or more residual blocks.

13. The processor of clause 8, wherein the curvature, defined by a higher-order derivative of the ODE function, corresponds to a denoising trajectory from the input noise image to output image data for the synthesized image.

14. The processor of clause 8, wherein the processor is comprised in at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a system for performing generative AI operations using a large language model (LLM),
a collaborative content creation platform for 3D assets; or
a system implemented at least partially using cloud computing resources.

15. A system, comprising:
one or more processors to generate a synthesized image of at least one object using a diffusion model, the one or more processors to provide a representation of an input noise image to the diffusion model and a separate neural network, and to use the diffusion model to denoise the input noise image over a number of denoising iterations using steps determined according to a curvature of an ordinary differential equation (ODE) inferred by the neural network.

16. The system of clause 15, wherein the diffusion model is a first order score-based generative model.

17. The system of clause 15, wherein the one or more processors are further to:
determine by the neural network, the ODE curvature according to a derivative term of an ODE function.

18. The system of clause 15, wherein the neural network is smaller than the diffusion network and uses a diffusion model architecture or a convolutional neural network architecture with one or more residual blocks.

19. The system of clause 15, wherein the curvature, defined by a higher-order derivative of an ODE function, corresponds to a denoising trajectory from the input noise image to output image data for the synthesized image 20. The system of clause 15, wherein the system comprises at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system for performing generative AI operations using a large language model (LLM),
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (for example, "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (for example, "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (for example, executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (for example, a propagating transient electric or electromagnetic transmission) but includes non-transitory data storage circuitry (for example, buffers, cache, and queues) within transceivers of transitory signals. In at least one embodiment, code (for example, executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main CPU executes some of instructions while a GPU executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (for example, "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an API or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
    providing, as input to a neural network, an input image including randomly added noise to one or more pixels of the input image;
    receiving, from the neural network, a curvature of an ordinary differential equation (ODE) to be used by a diffusion model to remove the randomly added noise from the one or more pixels of the input image;
    modifying, over a number of denoising iterations and based at least on the curvature of the ODE, the one or more pixels of the input image by removing at least a portion of the randomly added noise to generate decreasingly noisy depictions of one or more objects inferred by the diffusion model to be depicted in the input image; and
    generating, using the diffusion model and based at least on the iteratively modified image, a synthesized image representing at least one object.

2. The computer-implemented method of claim 1, wherein the diffusion model is a first order score-based generative model.

3. The computer-implemented method of claim 1, further comprising:
    determining, by the neural network, the curvature according to a derivative term of the ODE function.

4. The computer-implemented method of claim 3, wherein the neural network is to infer one or more Jacobian-vector products indicative of the curvature.

5. The computer-implemented method of claim 1, wherein the representation of the input image further includes at least a representation of the input image extracted at a last feature layer of the diffusion model together with a time embedding.

6. The computer-implemented method of claim 1, wherein the neural network requires less memory to instantiate than the diffusion model and uses a diffusion model architecture or a convolutional neural network architecture with one or more residual blocks.

7. The computer-implemented method of claim 1, wherein the curvature, defined by a higher-order derivative of the ODE function, corresponds to a denoising trajectory from the input image to output image data for the synthesized image.

8. A processor, comprising:
    one or more circuits to:
        provide an input image, including randomly added noise to one or more pixels of the input image, to a diffusion model;
        provide the input image to a separate neural network;
        receive, from the neural network, an approximation of a curvature of an ordinary differential equation (ODE) to be used by the diffusion model to remove the randomly added noise from the one or more pixels of the input image;
        modify, over a number of denoising iterations and based at least on the curvature, the input image by removing at least a portion of the randomly added noise from the one or more pixels to generate decreasingly noisy depictions of one or more objects inferred by the diffusion model to be depicted in the input image; and
        generate, based at least on the iteratively modified image, as output, a synthesized image representing at least one object.

9. The processor of claim 8, wherein the diffusion model is a first order score-based generative model.

10. The processor of claim 8, wherein the one or more circuits are further to:
    determine by the neural network, the curvature according to a derivative term of the ODE function.

11. The processor of claim 8, wherein the neural network is to infer one or more Jacobian-vector products indicative of the curvature.

12. The processor of claim 8, wherein the neural network requires less memory to instantiate than the diffusion model and uses a diffusion model architecture or a convolutional neural network architecture with one or more residual blocks.

13. The processor of claim 8, wherein the curvature, defined by a higher-order derivative of the ODE function, corresponds to a denoising trajectory from the input image to output image data for the synthesized image.

14. The processor of claim 8, wherein the processor is comprised in at least one of:
   a system for performing simulation operations;
   a system for performing simulation operations to test or validate autonomous machine applications;
   a system for performing digital twin operations;
   a system for performing light transport simulation;
   a system for rendering graphical output;
   a system for performing deep learning operations;
   a system implemented using an edge device;
   a system for generating or presenting virtual reality (VR) content;
   a system for generating or presenting augmented reality (AR) content;
   a system for generating or presenting mixed reality (MR) content;
   a system incorporating one or more Virtual Machines (VMs);
   a system implemented at least partially in a data center;
   a system for performing hardware testing using simulation;
   a system for synthetic data generation;
   a system for performing generative AI operations using a large language model (LLM),
   a collaborative content creation platform for 3D assets; or
   a system implemented at least partially using cloud computing resources.

15. A system, comprising:
   one or more processors to generate a synthesized image based at least on an iteratively modified image depicting at least one object using a diffusion model, the one or more processors to provide a representation of an input image that includes randomly added noise to one or more pixels of the image as an input to the diffusion model and a separate neural network, and to use the diffusion model to modify, over a number of denoising iterations using steps determined according to a curvature of an ordinary differential equation (ODE) inferred by the neural network, the input image by removing at least a portion of the randomly added noise from the one or more pixels of the input image and generating decreasingly noisy depictions of one or more objects inferred by the diffusion model to be depicted in the input image.

16. The system of claim 15, wherein the diffusion model is a first order score-based generative model.

17. The system of claim 15, wherein the one or more processors are further to:
   determine by the neural network, the curvature according to a derivative term of an ODE function.

18. The system of claim 15, wherein the neural network is smaller than the diffusion model and uses a diffusion model architecture or a convolutional neural network architecture with one or more residual blocks.

19. The system of claim 15, wherein the curvature, defined by a higher-order derivative of an ODE function, corresponds to a denoising trajectory from the input image to output image data for the synthesized image.

20. The system of claim 15, wherein the system comprises at least one of:
   a system for performing simulation operations;
   a system for performing simulation operations to test or validate autonomous machine applications;
   a system for performing digital twin operations;
   a system for performing light transport simulation;
   a system for rendering graphical output;
   a system for performing deep learning operations;
   a system for performing generative AI operations using a large language model (LLM),
   a system implemented using an edge device;
   a system for generating or presenting virtual reality (VR) content;
   a system for generating or presenting augmented reality (AR) content;
   a system for generating or presenting mixed reality (MR) content;
   a system incorporating one or more Virtual Machines (VMs);
   a system implemented at least partially in a data center;
   a system for performing hardware testing using simulation;
   a system for synthetic data generation;
   a collaborative content creation platform for 3D assets; or
   a system implemented at least partially using cloud computing resources.

* * * * *